US012089705B1

(12) United States Patent
Lynch

(10) Patent No.: US 12,089,705 B1
(45) Date of Patent: Sep. 17, 2024

(54) ENHANCED PORTABLE ELECTRONIC DEVICE CASE ACCESSORY ENGAGEMENT SYSTEM

(71) Applicant: Pioneer Square Brands, Inc., High Point, NC (US)

(72) Inventor: Riley Edwin Lynch, Greensboro, NC (US)

(73) Assignee: Pioneer Square Brands, Inc., High Point, NC (US)

( * ) Notice: Subject to any disclaimer, the term of this patent is extended or adjusted under 35 U.S.C. 154(b) by 0 days.

(21) Appl. No.: 18/654,970

(22) Filed: May 3, 2024

(51) Int. Cl.
*A45C 11/00* (2006.01)
*A45C 15/00* (2006.01)
*G07F 7/08* (2006.01)

(52) U.S. Cl.
CPC .............. *A45C 11/00* (2013.01); *A45C 15/00* (2013.01); *G07F 7/0886* (2013.01)

(58) Field of Classification Search
CPC ................................ A45C 11/00; A45C 15/00
USPC .......................................................... 235/380
See application file for complete search history.

(56) References Cited

U.S. PATENT DOCUMENTS 8,602,304 B2 * 12/2013 Cohen ...................... H04M 1/04 361/679.06
9,894,192 B2 * 2/2018 Cox, III ................ G06F 1/1656
11,930,604 B1 3/2024 Lynch et al.
2017/0049000 A1 * 2/2017 Kang ..................... A45C 11/00
2019/0215388 A1 * 7/2019 Cantoli-Alves ...... A45C 11/182

* cited by examiner

*Primary Examiner* — Ahshik Kim
(74) *Attorney, Agent, or Firm* — Grandview Law

(57) ABSTRACT

A system for a portable electronic device and a portable electronic device case includes an accessory assembly including a first side portion including and an exterior surface portion with at least one elongated channel portion therefrom, and a second side portion extending perpendicular with the first side portion. The accessory assembly is removably couplable to the portable electronic device case and is removably couplable to the portable electronic device. The accessory assembly includes at least one electronic function for the portable electronic device. The first side portion of the accessory assembly remains unobstructed when the accessory assembly is coupled with the portable electronic device case. The first side portion of the accessory assembly remains unobstructed when the accessory assembly is coupled with the portable electronic device.

20 Claims, 26 Drawing Sheets

ENHANCED PORTABLE ELECTRONIC DEVICE CASE ACCESSORY ENGAGEMENT SYSTEM

SUMMARY

A system for a portable electronic device and a portable electronic device case that includes (I) an accessory assembly including (A) a first side portion including and an exterior surface portion with at least one elongated channel portion therefrom, and (B) a second side portion extending perpendicular with the first side portion; wherein the accessory assembly is removably couplable to the portable electronic device case and is removably couplable to the portable electronic device, wherein the accessory assembly includes at least one electronic function for the portable electronic device, wherein the first side portion of the accessory assembly remains unobstructed when the accessory assembly is coupled with the portable electronic device case, and wherein the first side portion of the accessory assembly remains unobstructed when the accessory assembly is coupled with the portable electronic device. In implementations the at least one elongated channel lacks an end wall to provide at least one entry portion. In implementations the second side portion lacks a portion to provide the at least one entry portion. In implementations the at least one elongated channel extends perpendicular with the second side portion. In implementations the accessory assembly further includes a cover component, wherein the cover component includes a planar surface portion, wherein the cover component includes at least one elongated rail portion extending from the planar surface portion, wherein the at least one elongated rail portion is sized to couple with the at least one elongated channel portion, and wherein the planar surface portion of the cover component is adjacent the exterior surface portion of the first side when the at least one elongated rail portion is coupled with the at least one elongated channel portion. In implementations the adapter assembly includes a planar surface portion, wherein the adapter assembly includes at least one elongated rail portion extending from the planar surface portion, wherein the at least one elongated rail portion is sized to couple with the at least one elongated channel portion, and wherein the planar surface portion of the adapter assembly is adjacent the exterior surface portion of the first side when the at least one elongated rail portion is coupled with the at least one elongated channel portion. In implementations the adapter assembly is removably couplable with at least one electronic payment card reader. In implementations the adapter assembly is couplable with at least one electronic payment card reader in more that one orientation of the electronic payment card reader.

A system for a portable electronic device and a portable electronic device case includes (I) an accessory assembly including (A) a first side portion including and an exterior surface portion with at least one elongated channel portion therefrom, and (B) a second side portion extending perpendicular with the first side portion; and (II) an adapter assembly including at least one planar surface portion, at least one elongated one elongated rail portion extending from the at least one planar surface portion, wherein the accessory assembly is removably couplable to the portable electronic device case and is removably couplable to the portable electronic device, wherein the accessory assembly includes at least one electronic function for the portable electronic device, wherein the first side portion of the accessory assembly remains unobstructed when the accessory assembly is coupled with the portable electronic device case, wherein the first side portion of the accessory assembly remains unobstructed when the accessory assembly is coupled with the portable electronic device, and wherein the at least one elongated rail portion is sized to removably couple with the at least one elongated channel portion to removably couple the adapter assembly with the accessory assembly. In implementations the planar surface portion of the adapter assembly is adjacent the exterior surface portion of the first side of the accessory assembly when the at least one elongated rail portion is coupled with the at least one elongated channel portion. In implementations the adapter assembly is removably couplable with at least one electronic payment card reader. In implementations the adapter assembly is couplable with at least one electronic payment card reader in more that one orientation of the electronic payment card reader. In implementations In implementations In implementations In implementations In implementations the adapter assembly includes a depressed portion shaped to couple with at least one electronic payment card reader.

A system for a portable electronic device including (I) an accessory assembly including (A) a first side portion including and an exterior surface portion with at least one elongated channel portion therefrom, and (B) a second side portion extending perpendicular with the first side portion; and (II) a portable electronic device case assembly including (A) a docking bay; wherein the accessory assembly includes at least one electronic function for the portable electronic device, wherein the accessory assembly is removably couplable with the docking bay of the portable electronic device case, and wherein the first side portion of the accessory assembly remains unobstructed when the accessory assembly is coupled with the portable electronic device case. In implementations the at least one elongated channel lacks an end wall to provide at least one entry portion. In implementations the accessory assembly further includes a cover component, wherein the cover component includes a planar surface portion, wherein the cover component includes at least one elongated rail portion extending from the planar surface portion, wherein the at least one elongated rail portion is sized to couple with the at least one elongated channel portion, and wherein the planar surface portion of the cover component is adjacent the exterior surface portion of the first side when the at least one elongated rail portion is coupled with the at least one elongated channel portion. Implementations further including an adapter assembly, wherein the adapter assembly includes a planar surface portion, wherein the adapter assembly includes at least one elongated rail portion extending from the planar surface portion, wherein the at least one elongated rail portion is sized to couple with the at least one elongated channel portion, and wherein the planar surface portion of the adapter assembly is adjacent the exterior surface portion of the first side when the at least one elongated rail portion is coupled with the at least one elongated channel portion. In implementations the adapter assembly is removably couplable with at least one electronic payment card reader. In implementations the adapter assembly includes a depressed portion shaped to couple with at least one electronic payment card reader.

In addition to the foregoing, other aspects are described in the claims, drawings, and text forming a part of the disclosure set forth herein. Various other aspects are set forth and described in the teachings such as text (e.g., claims and/or detailed description) and/or drawings of the present disclosure. The foregoing is a summary and thus may contain simplifications, generalizations, inclusions, or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

For a more complete understanding of implementations, reference now is made to the following descriptions taken in connection with the accompanying drawings. The use of the same symbols in different drawings typically indicates similar or identical items, unless context dictates otherwise.

Figure 1:
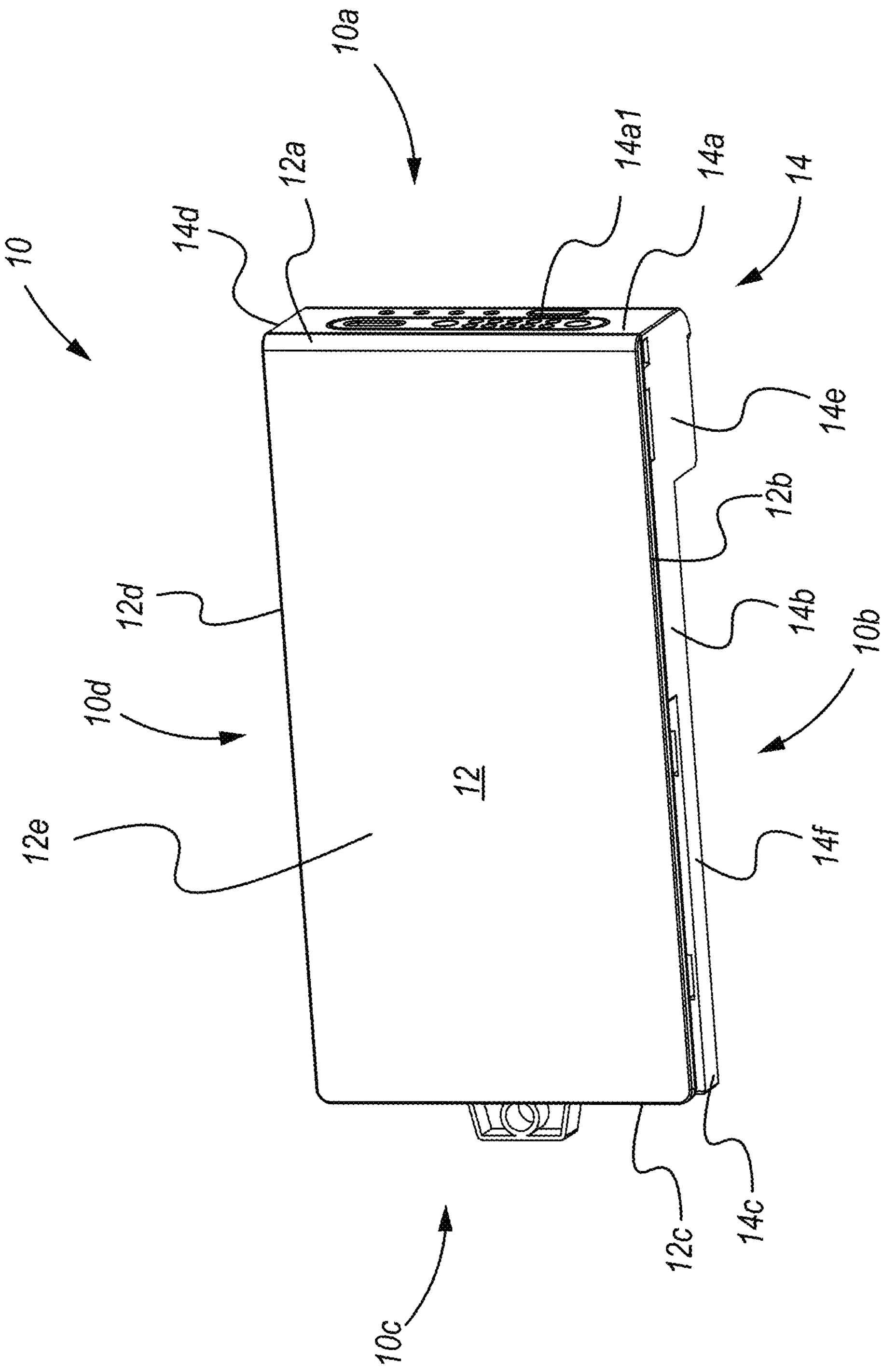
FIG. 1 is a top perspective view of an accessory assembly.

With reference now to the figures, shown are one or more examples of Enhanced Portable Electronic Device Case Accessory Engagement System, articles of manufacture, compositions of matter for same that may provide context, for instance, in introducing one or more processes and/or devices described herein.

DETAILED DESCRIPTION

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here.

Turning to FIG. 1, depicted therein is a top perspective view of an accessory assembly 10. Depicted implementation of accessory assembly 10 is shown to include cover component 12 and accessory component 14. Depicted implementation of accessory assembly 10 is shown to include side 10*a*, side 10*b*, side 10*c*, and side 10*d*. Depicted implementation of cover component 12 is shown to include side 12*a*, side 12*b*, side 12*c*, and side 12*d*. Depicted implementation of accessory component 14 is shown to include side 14*a* with interface 14*a*1, side 14*b*, side 14*c*, side 14*d*, base portion 14*e*, and extended portion 14*f*.

Figure 2:
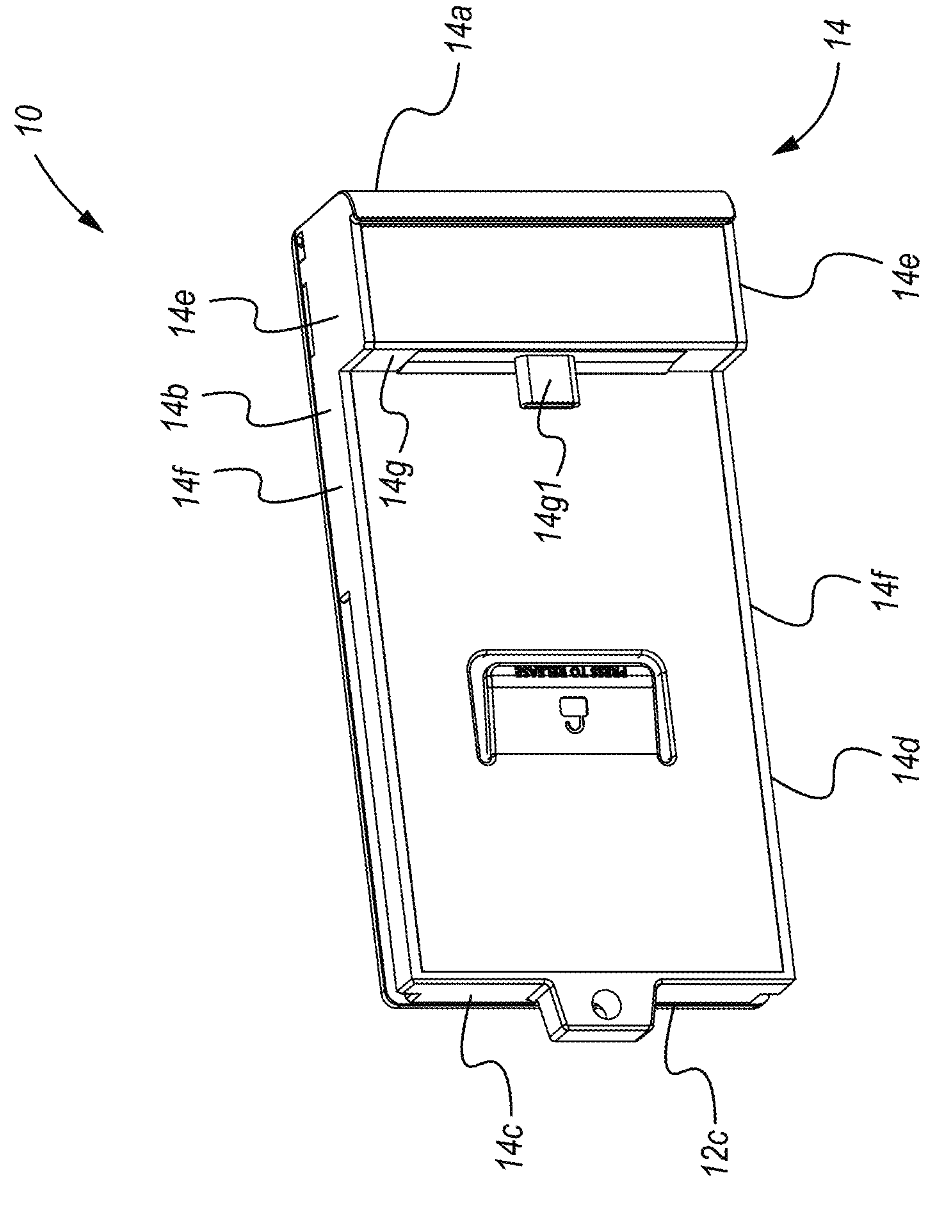
FIG. 2 is a bottom perspective view of the accessory assembly of FIG. 1.

Turning to FIG. 2, depicted therein is a bottom perspective view of accessory assembly 10. Depicted implementation of accessory component 14 is shown to include interior face 14*g* with electrical coupler 14*g*1.

Figure 3:
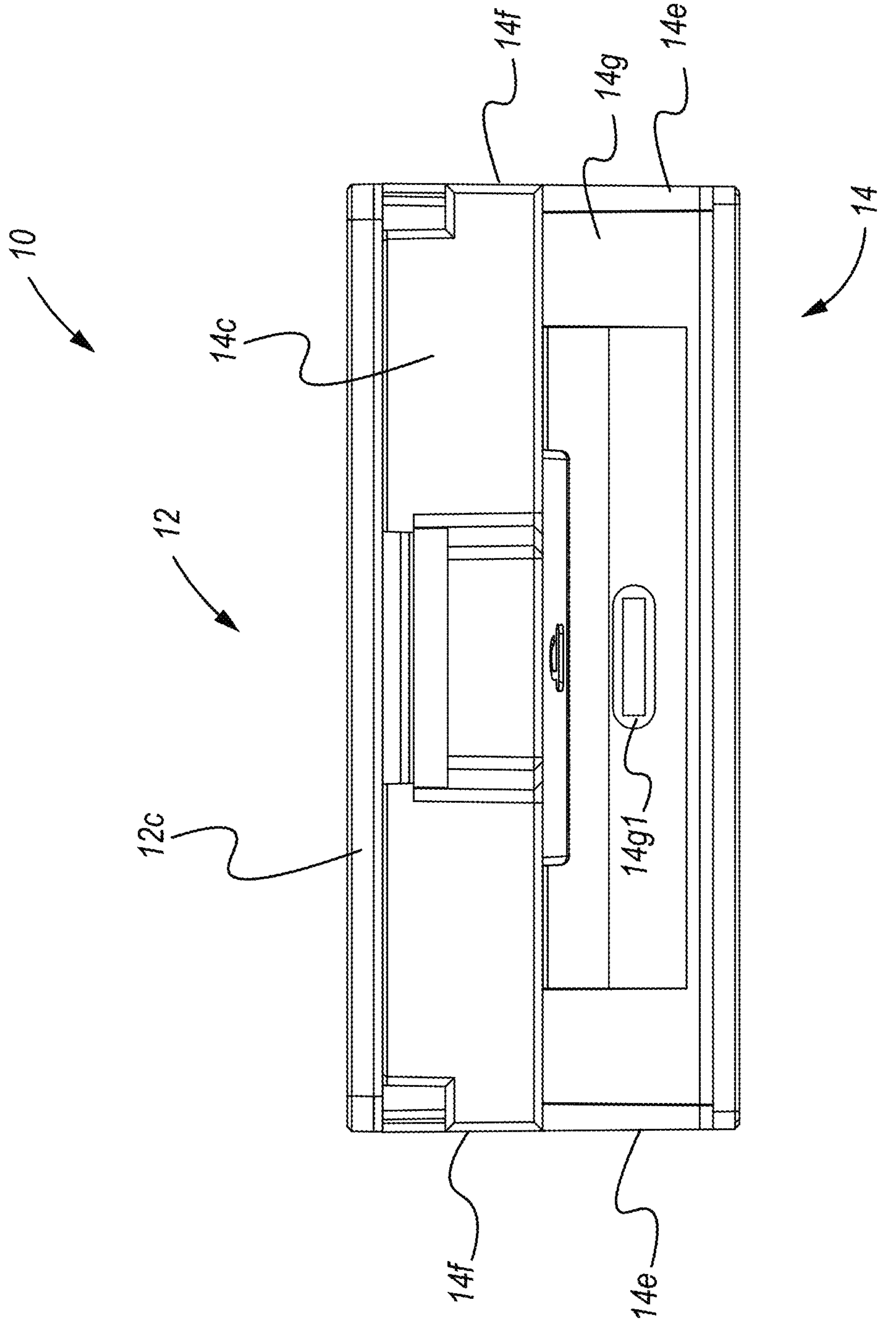
FIG. 3 is a rear elevational view of the accessory assembly of FIG. 1.

Turning to FIG. 3, depicted therein is a rear elevational view of accessory assembly 10.

Figure 4:
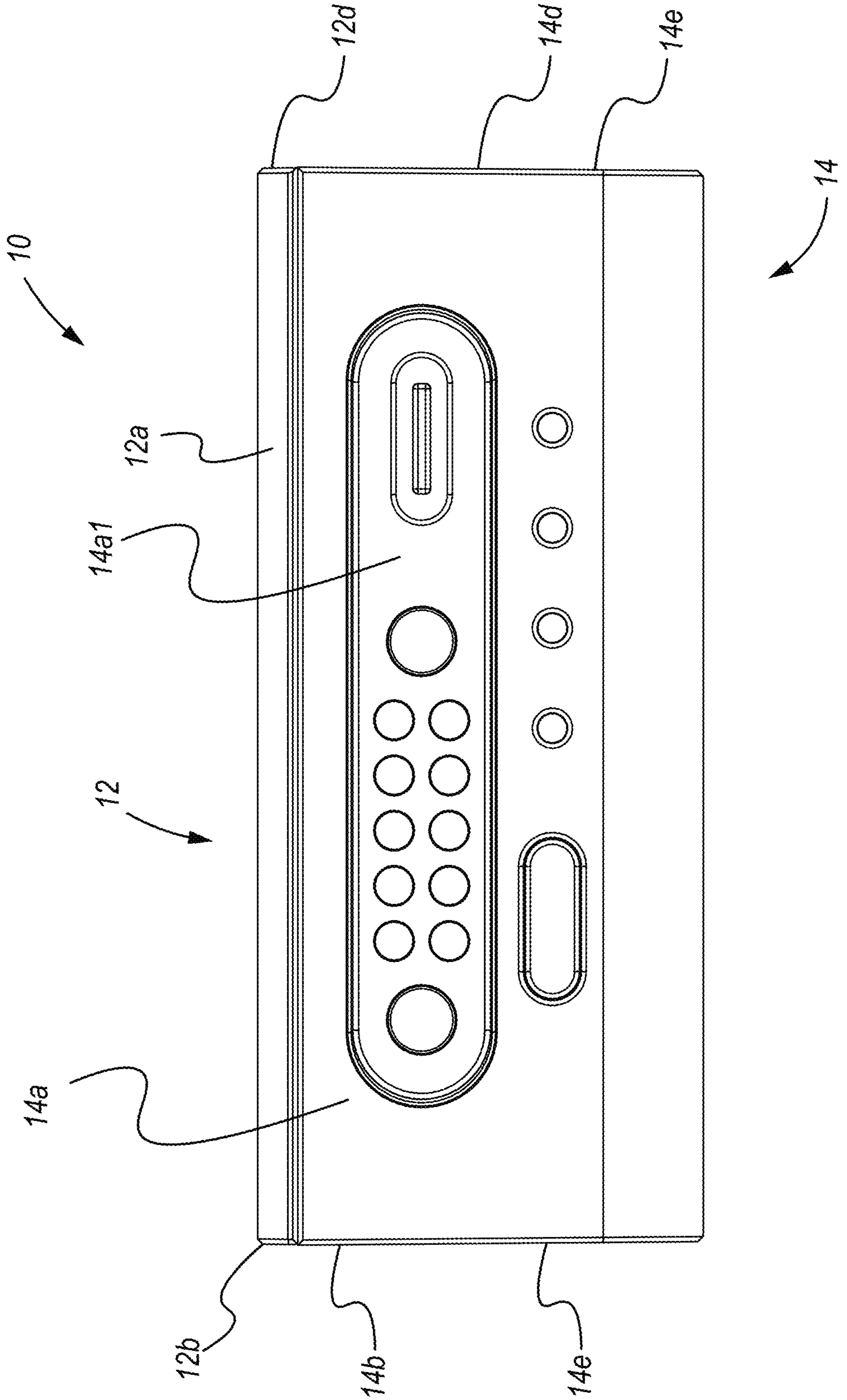
FIG. 4 is a front elevational view of the accessory assembly of FIG. 1.

Turning to FIG. 4, depicted therein is a front elevational view of accessory assembly 10.

Figure 5:
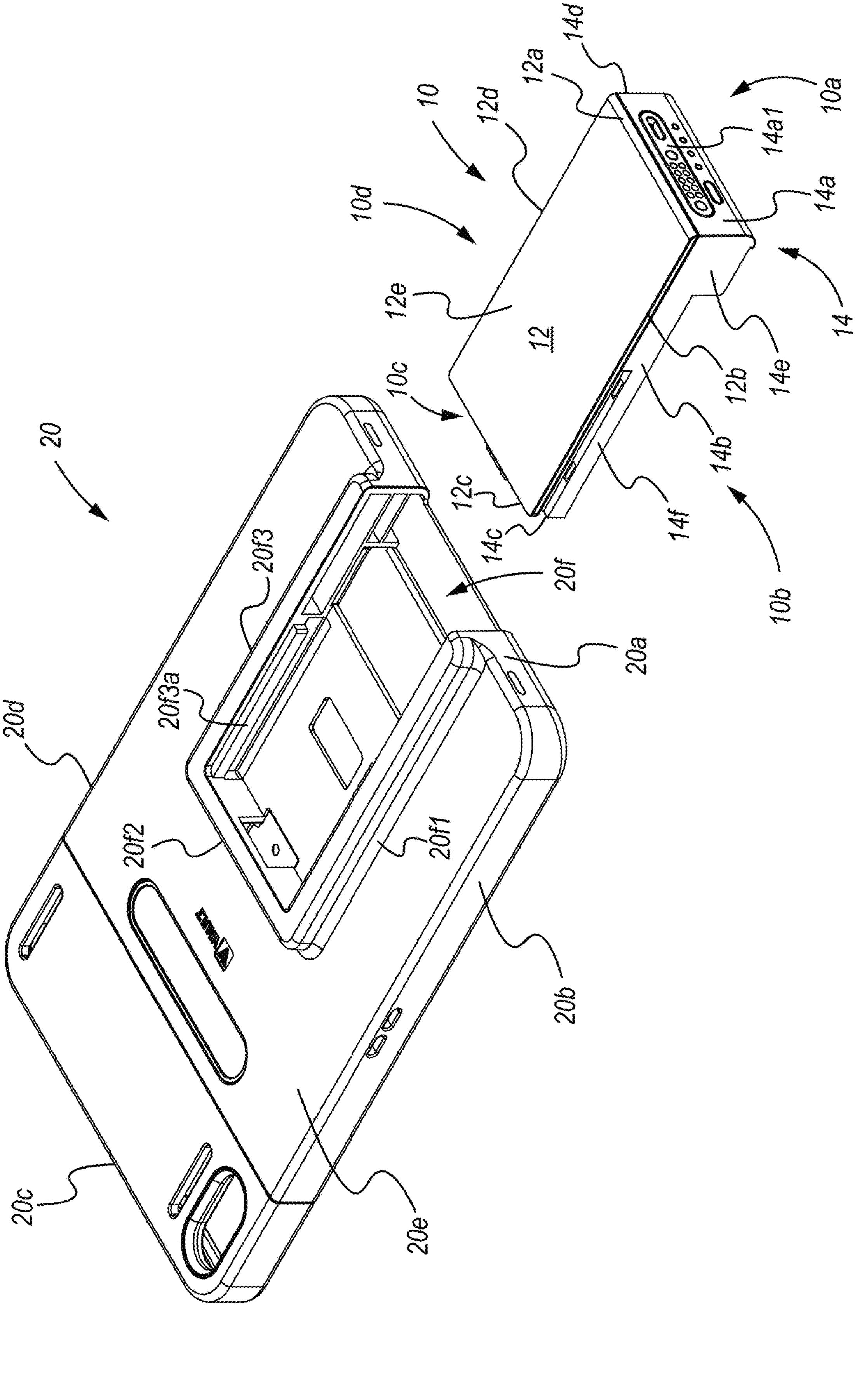
FIG. 5 is a top perspective view of a case assembly uncoupled from the accessory assembly of FIG. 1.
Figure 6:
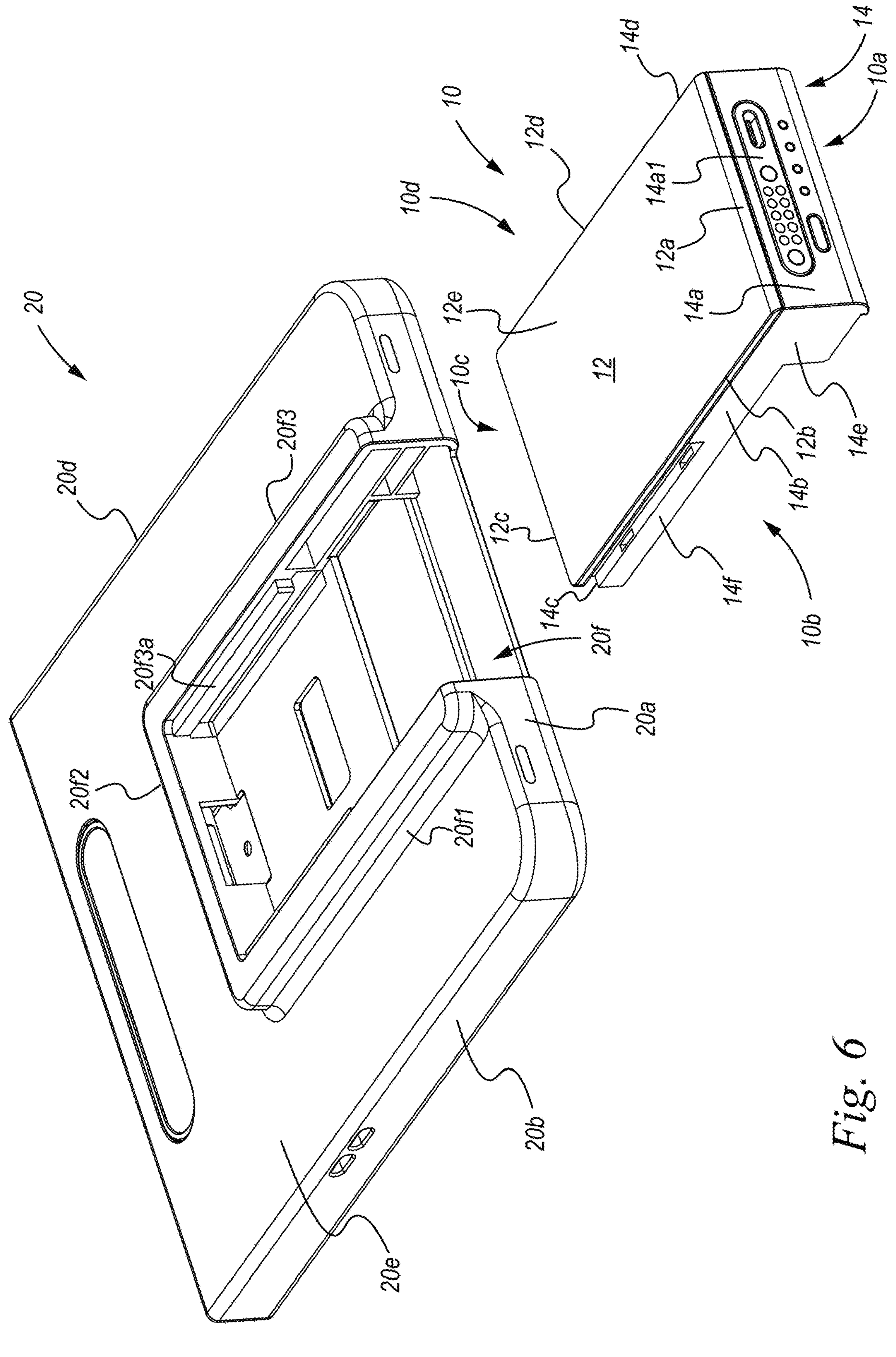
FIG. 6 is an enlarged top perspective view of a portion of the case assembly of FIG. 5 uncoupled from the accessory assembly of FIG. 1.

Turning to FIG. 5, depicted therein is a top perspective view of case assembly 20 uncoupled from accessory assembly 10. Depicted implementation of case assembly 20 is shown to include side 20*a*, end 20*b*, side 20*c*, end 20*d*, upper portion 20*e*, and docking bay 20*f*. Depicted implementation of docking bay 20*f* is shown to include wall 20*f*1, wall 20*f*2, and wall 20*f*3 with engagement rail 20*f*3*a*. Turning to FIG. 6, depicted therein is an enlarged top perspective view of a portion of case assembly 20 uncoupled from accessory assembly 10.

Figure 7:
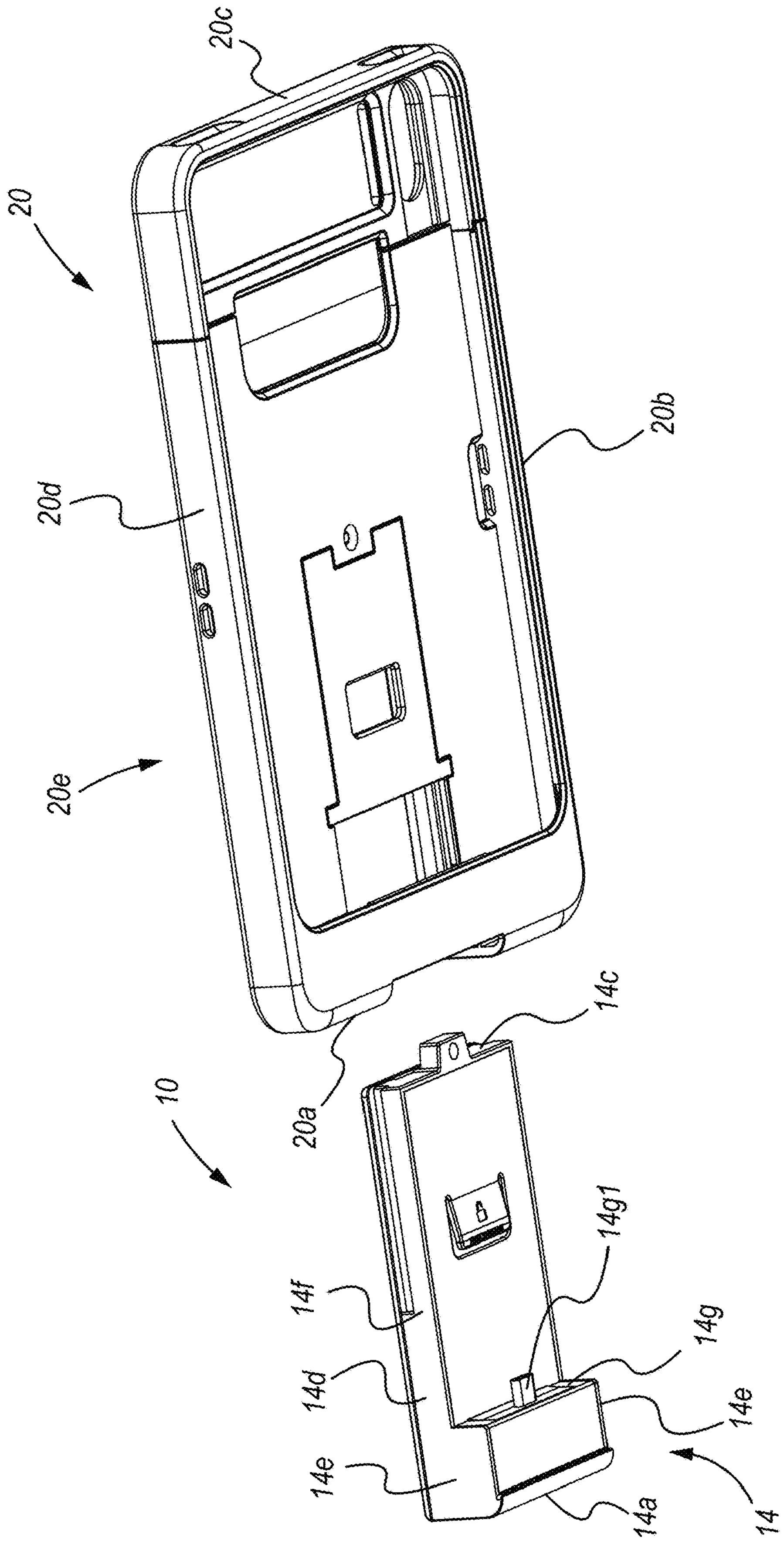
FIG. 7 is a bottom perspective view of the case assembly of FIG. 5 uncoupled from the accessory assembly of FIG. 1.

Turning to FIG. 7, depicted therein is a bottom perspective view of case assembly 20 uncoupled from accessory assembly 10.

Figure 8:
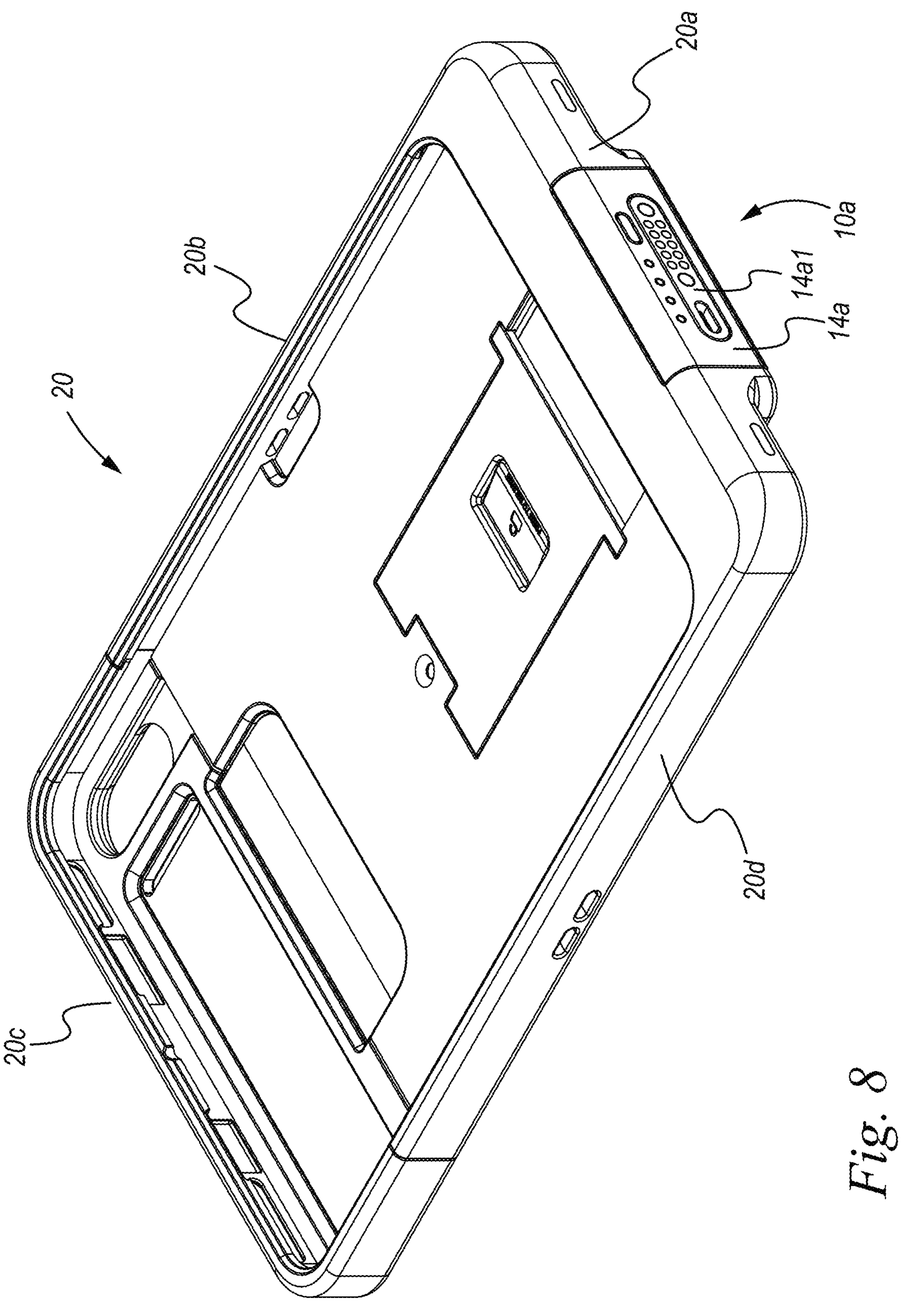
FIG. 8 is a first bottom perspective view of the case assembly of FIG. 5 coupled with the accessory assembly of FIG. 1.

Turning to FIG. 8, depicted therein is a first bottom perspective view of case assembly 20 coupled with accessory assembly 10.

Figure 9:
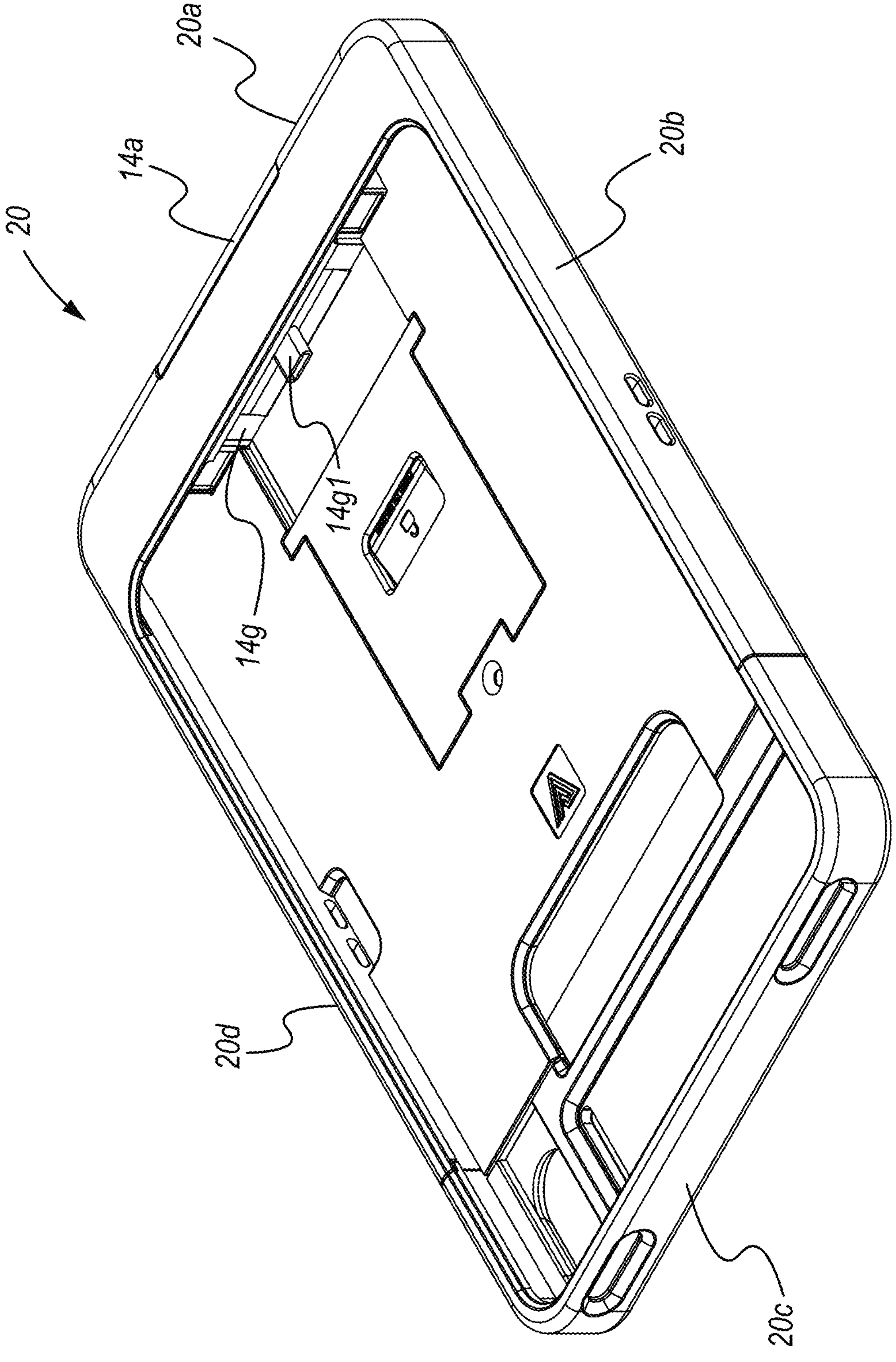
FIG. 9 is a second bottom perspective view of the case assembly of FIG. 5 coupled with the accessory assembly of FIG. 1.

Turning to FIG. 9, depicted therein is a second bottom perspective view of case assembly 20 coupled with accessory assembly 10.

Figure 10:
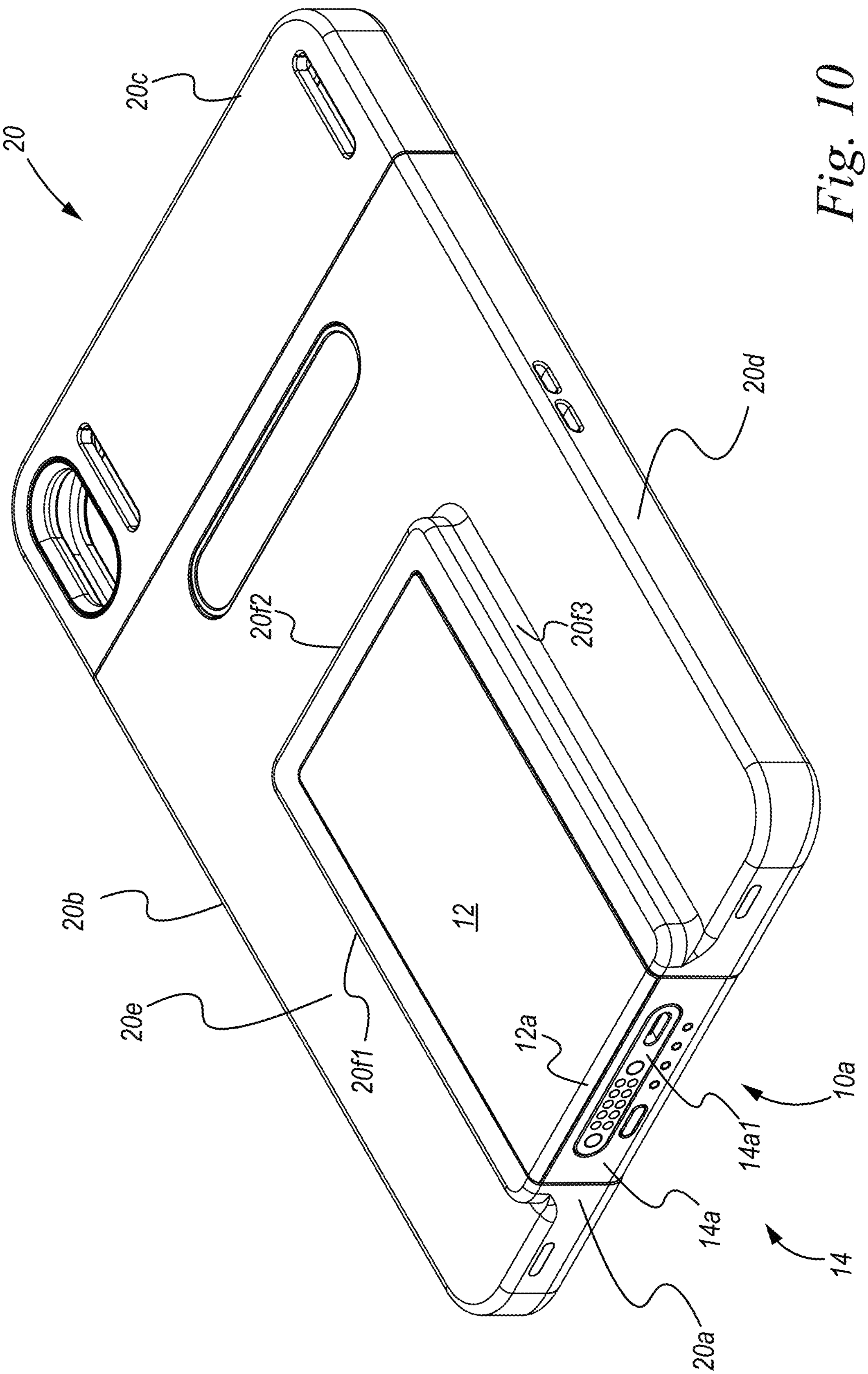
FIG. 10 is a first top perspective view of the case assembly of FIG. 5 coupled with the accessory assembly of FIG. 1.

Turning to FIG. 10, depicted therein is a first top perspective view of case assembly 20 coupled with accessory assembly 10.

Figure 11:
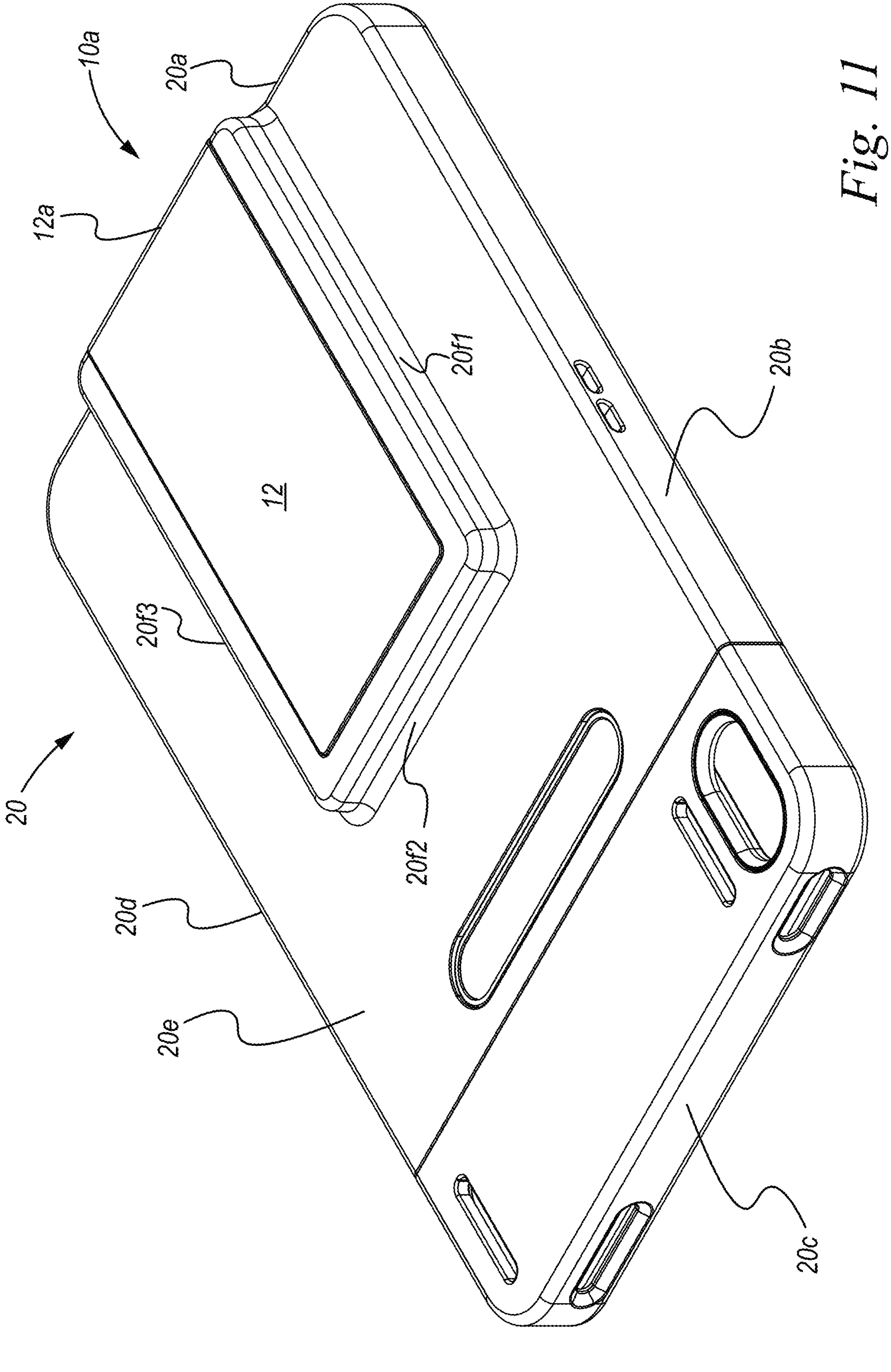
FIG. 11 is a second top perspective view of the case assembly of FIG. 5 coupled with the accessory assembly of FIG. 1.

Turning to FIG. 11, depicted therein is a second top perspective view of case assembly 20 coupled with accessory assembly 10.

Figure 12:
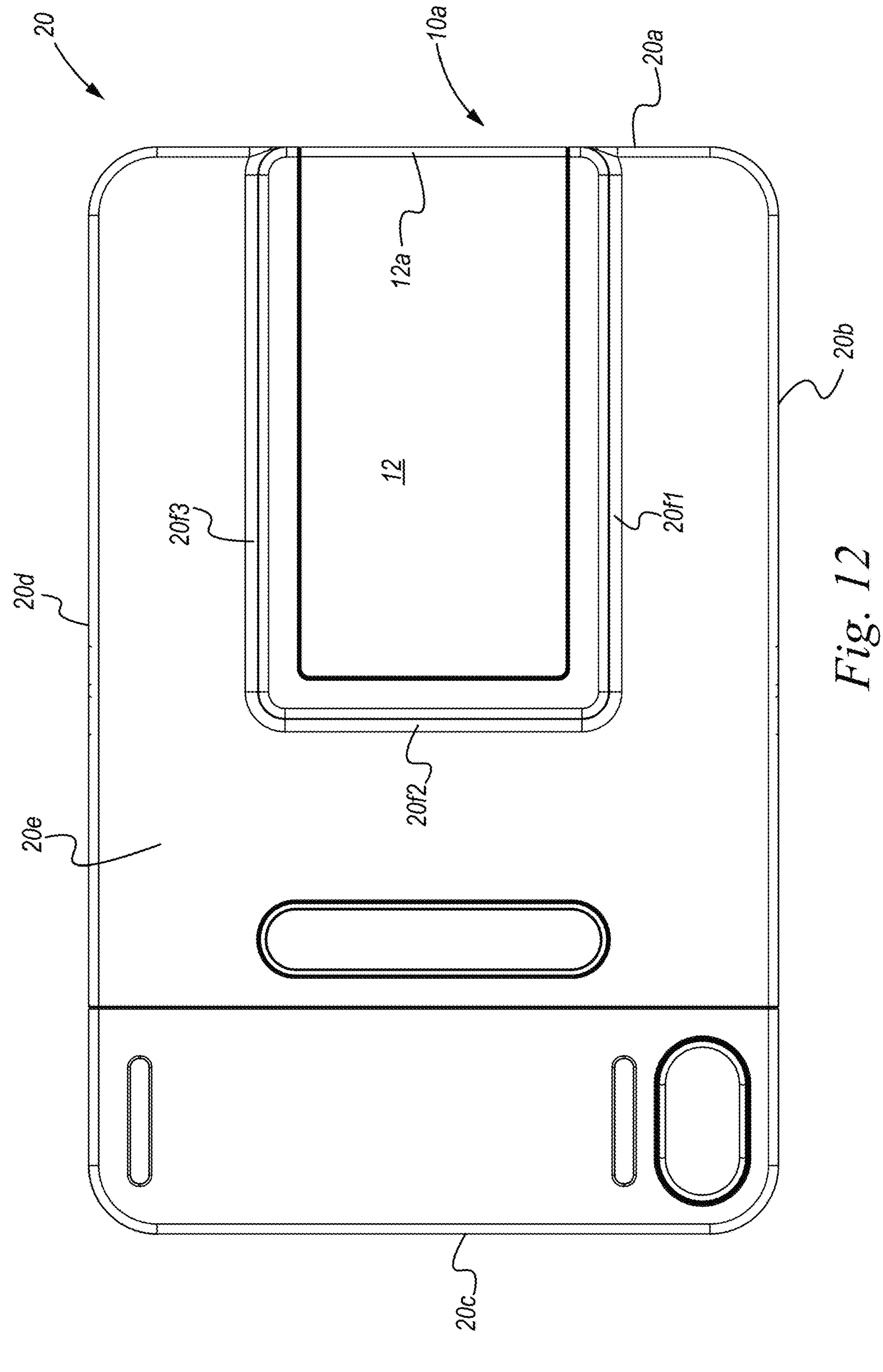
FIG. 12 is a top plan view of the case assembly of FIG. 5 coupled with the accessory assembly of FIG. 1.

Turning to FIG. 12, depicted therein is a top plan view of case assembly 20 coupled with accessory assembly 10.

Figure 13:
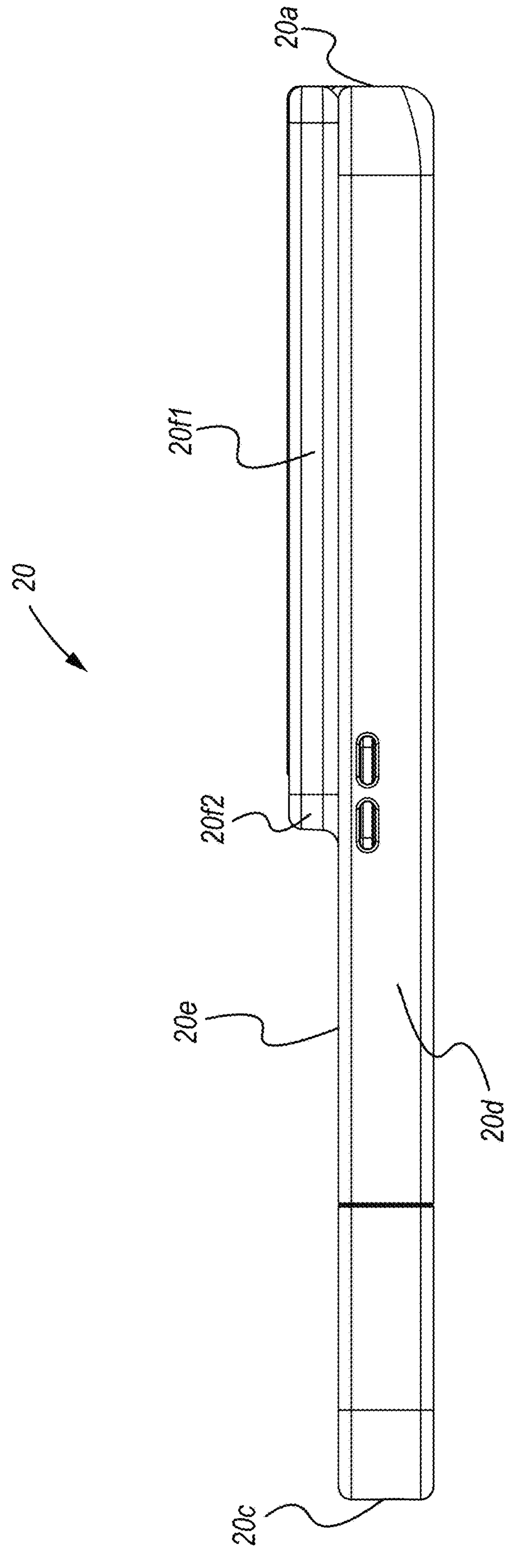
FIG. 13 is a side elevational view of the case assembly of FIG. 5 coupled with the accessory assembly of FIG. 1.

Turning to FIG. 13, depicted therein is a side elevational view of case assembly 20 coupled with accessory assembly 10.

Figure 14:
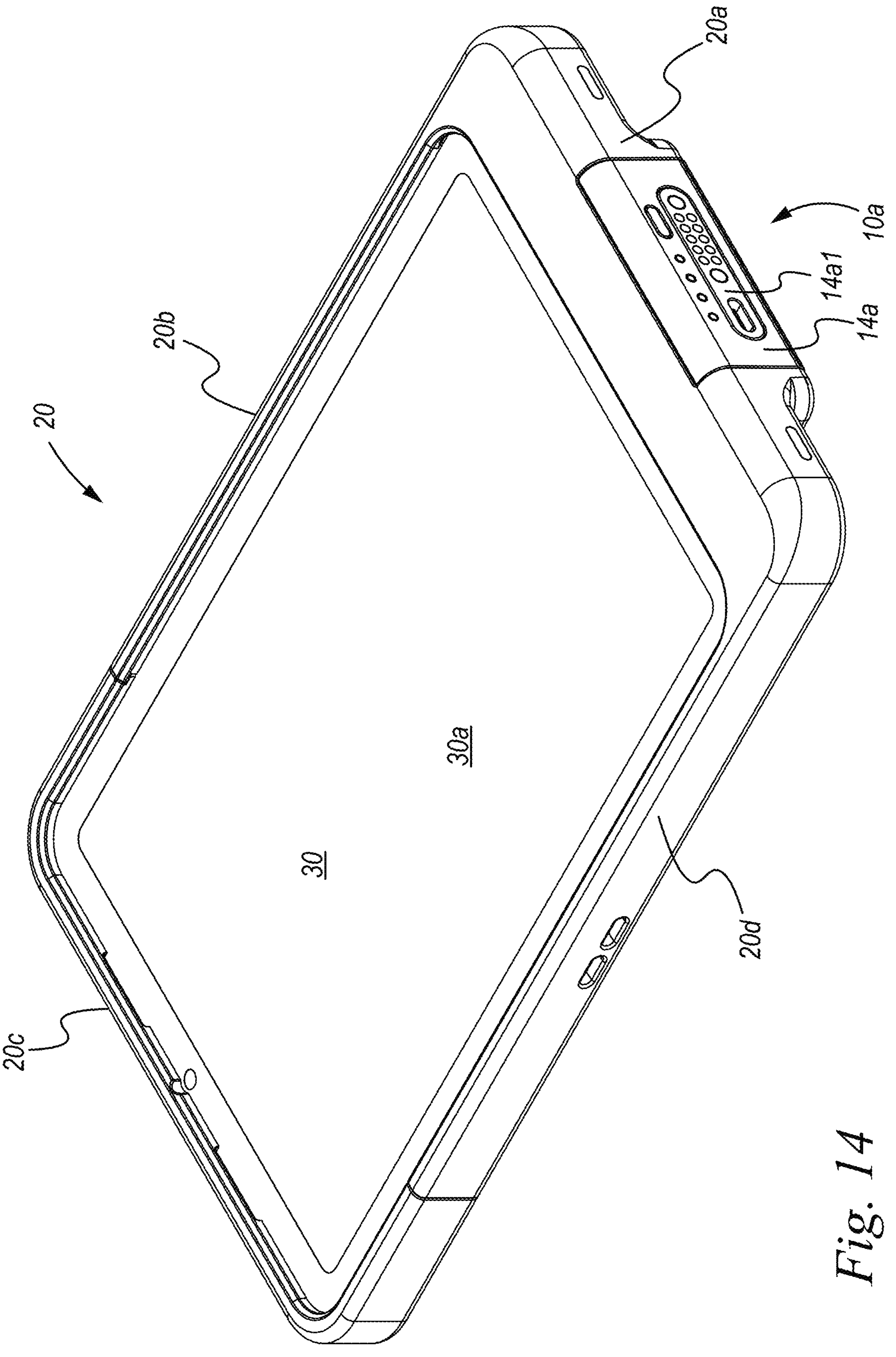
FIG. 14 is a first bottom perspective view of the case assembly of FIG. 5 coupled with a portable electronic device, which are both coupled with the accessory assembly of FIG. 1.
Figure 15:
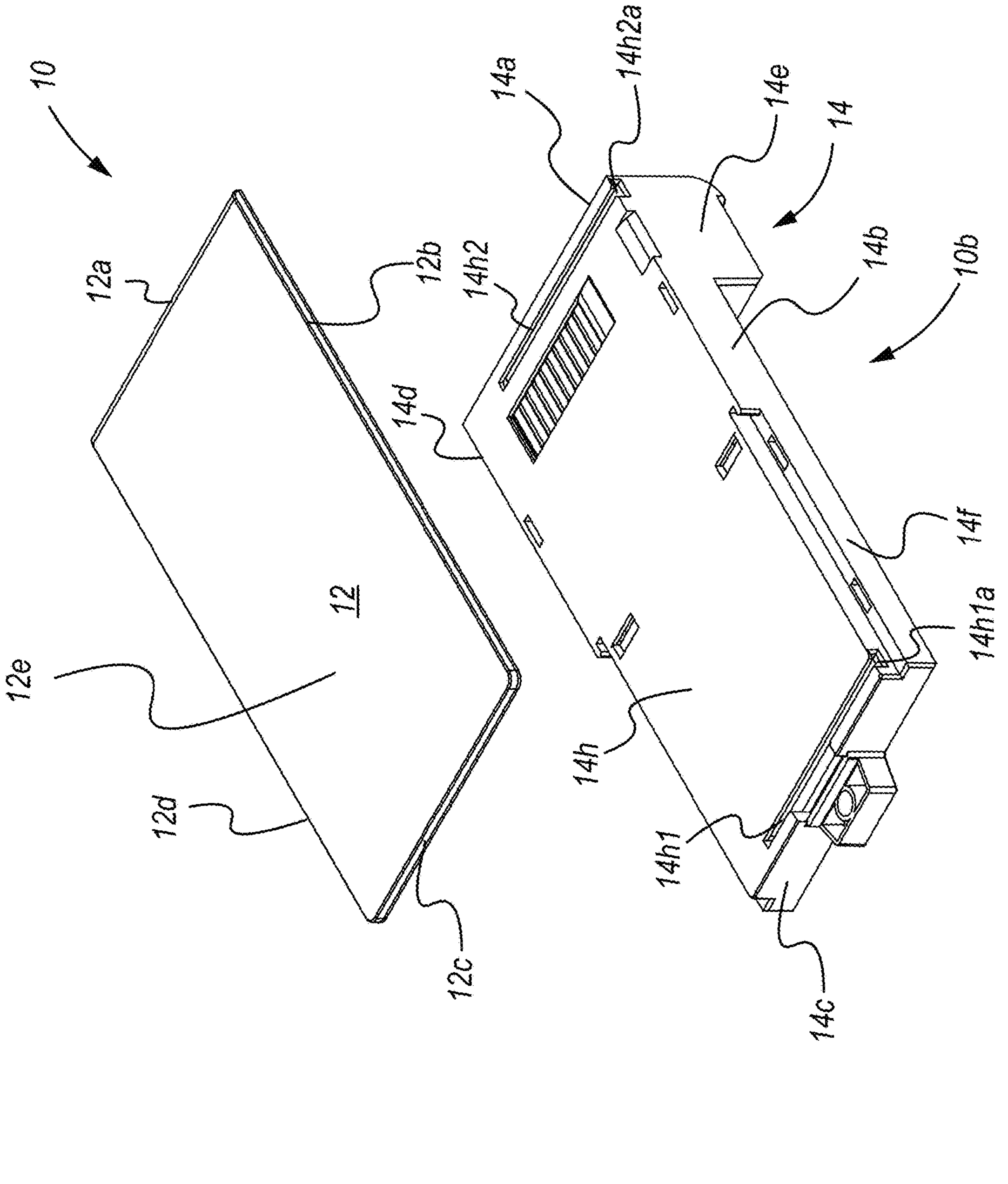
FIG. 15 is a partially exploded top perspective view of the accessory assembly of FIG. 1.

Turning to FIG. 14, depicted therein is a first bottom perspective view of case assembly 20 coupled with portable electronic device 30, which are both coupled with accessory assembly 10. Depicted implementation of portable electronic device 30 is shown to include display 30*a*. Turning to FIG. 15, depicted therein is a partially exploded top perspective view of accessory assembly 10. Depicted implementation of accessory component 14 is shown to include exterior upper 14*h* with longitudinal channel 14*h*1 having channel entry 14*h*1*a*, and with longitudinal channel 14*h*2 having channel entry 14*h*2*a*.

Figure 16:
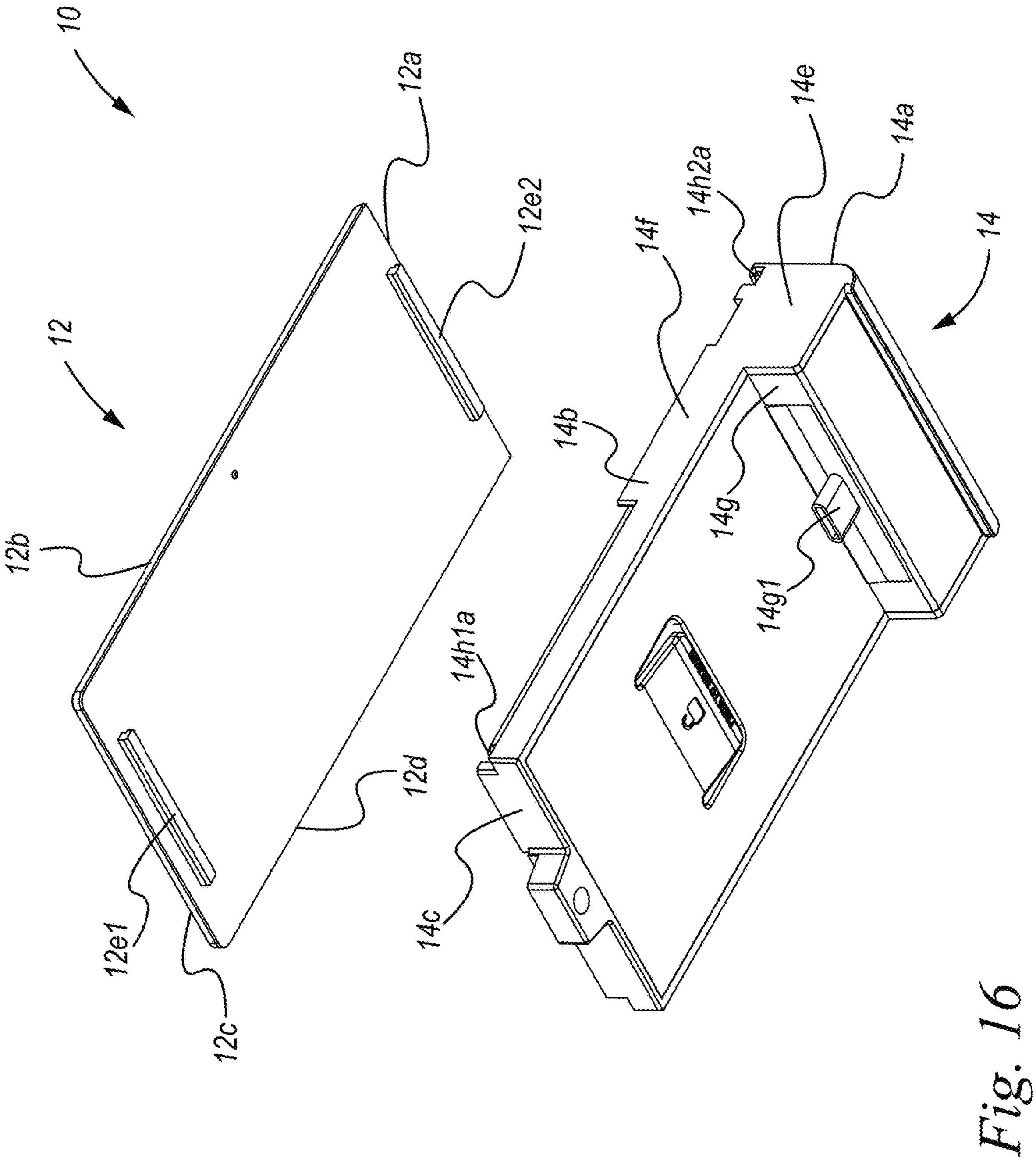
FIG. 16 is a partially exploded bottom perspective view of the accessory assembly of FIG. 1.

Turning to FIG. 16, depicted therein is a partially exploded bottom perspective view of accessory assembly 10. Depicted implementation of base 12*e* is shown to include elongated rail portion 12*e*1 and elongated rail portion 12*e*2.

Figure 17:
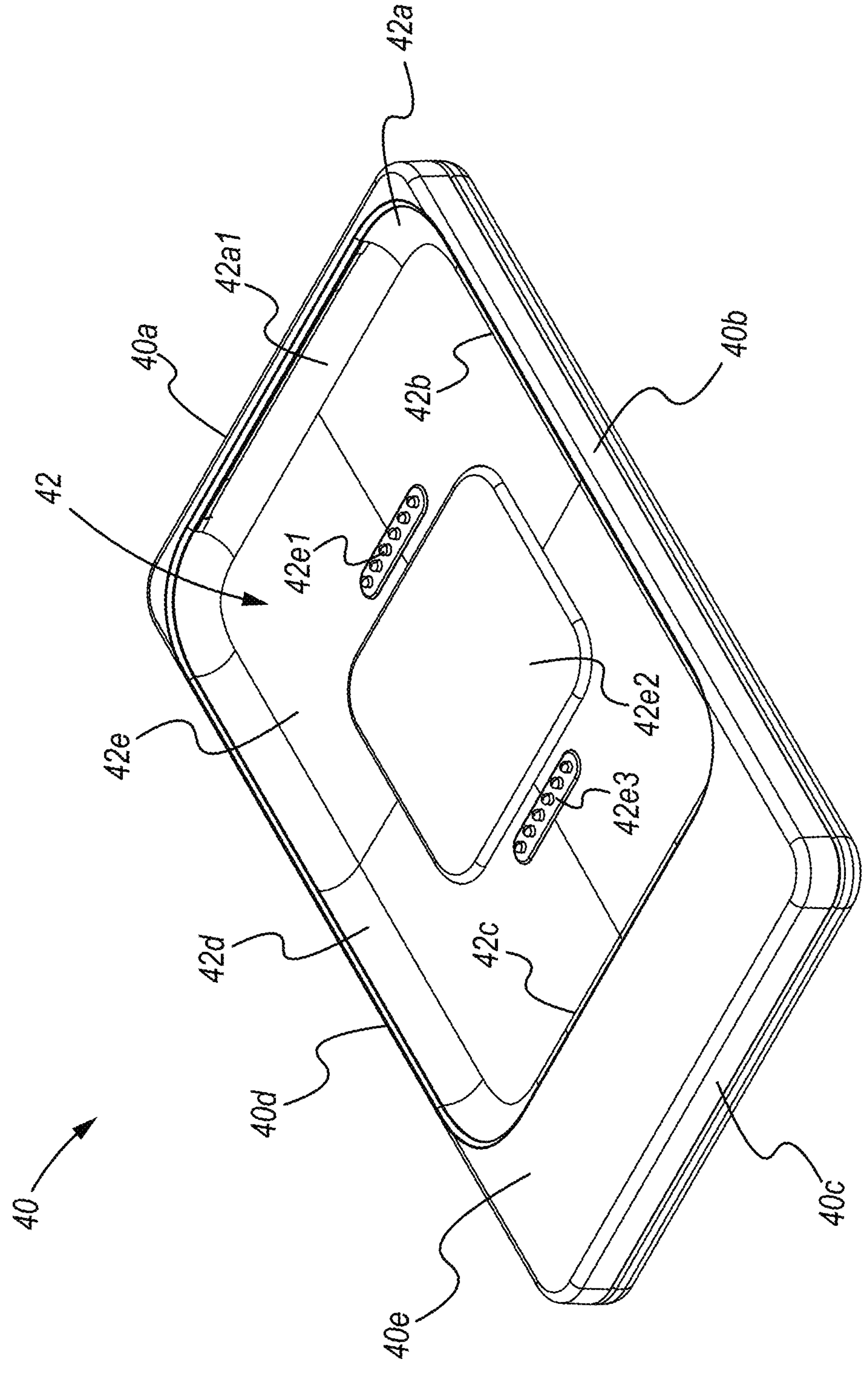
FIG. 17 is a top perspective view of an adapter assembly.

Turning to FIG. 17, depicted therein is a top perspective view of adapter assembly 40. Depicted implementation of adapter assembly 40 is shown to include side 40*a*, side 40*b*, side 40*c*, side 40*d*, upper face 40*e*, and depressed portion 42. Depicted implementation of depressed portion 42 is shown to include side 42*a* with engagement 42*a*1, side 42*b*, side 42*c*, side 42*d*, and base 42*e* with electrical interface 42*e*1, coupling surface 42*e*2, and electrical interface 42*e*3.

Figure 18:
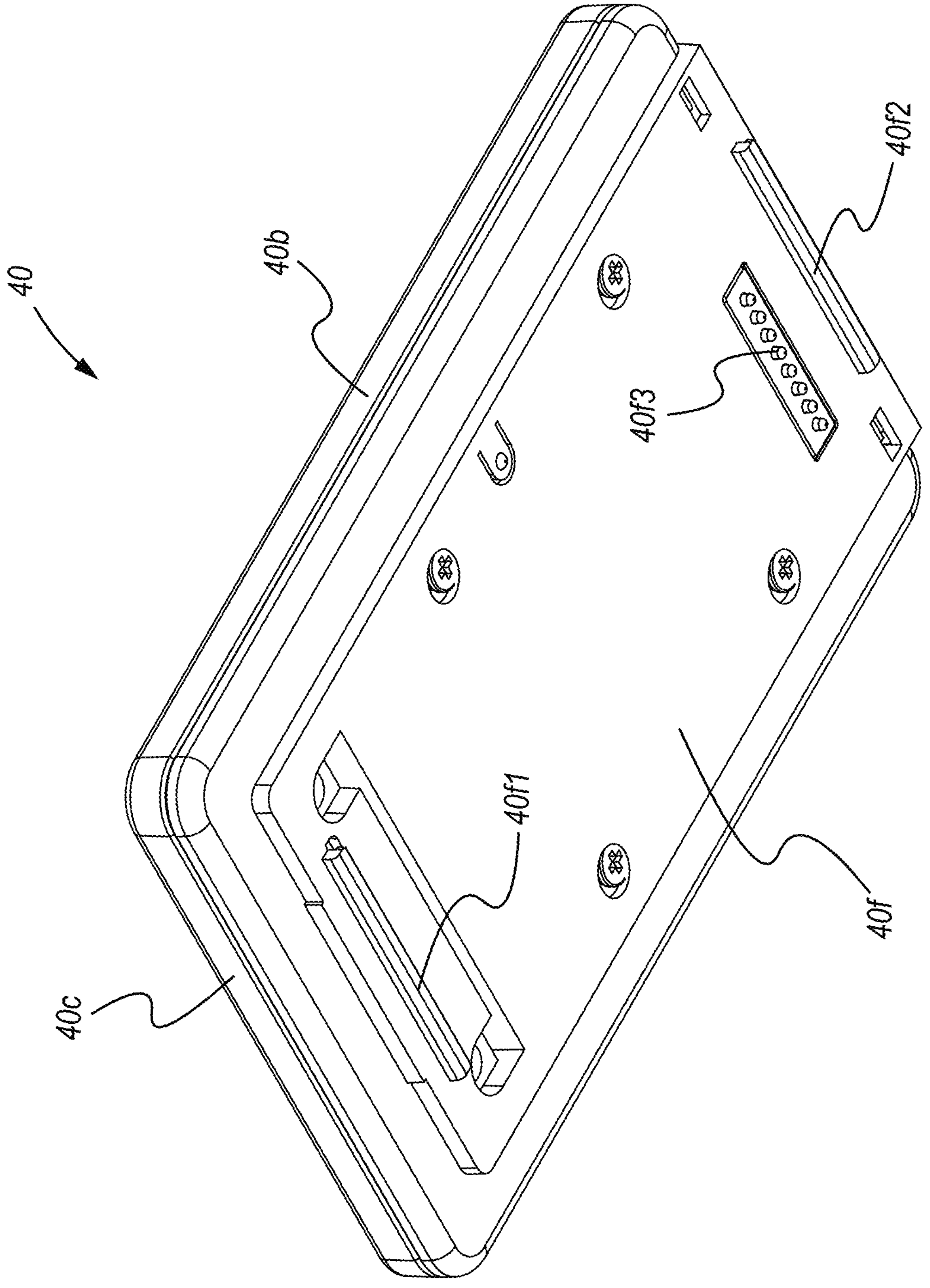
FIG. 18 is a bottom perspective view of the adapter assembly of FIG. 17.

Turning to FIG. 18, depicted therein is a bottom perspective view of adapter assembly 40. Depicted implementation of adapter assembly 40 is shown to include base 40*f* with engagement rail 40*f*1, engagement rail 40*f*2, and electrical interface 40*f*3.

Figure 19:
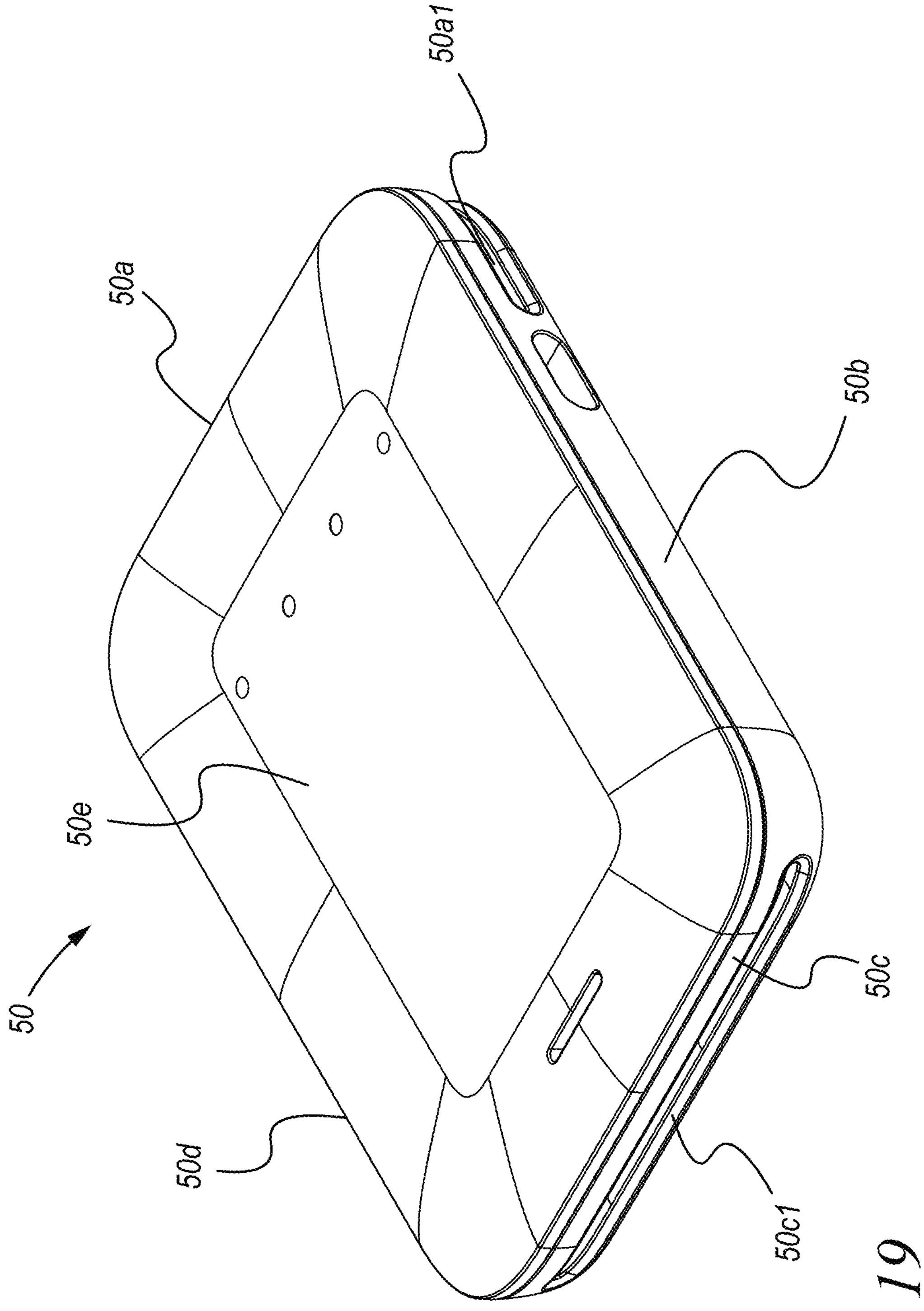
FIG. 19 is a first top perspective view of a card reader assembly.

Turning to FIG. 19, depicted therein is a first top perspective view of card reader assembly 50. Depicted implementation of card reader assembly 50 is shown to include side 50*a* with card slot 50*a*1, side 50*b*, side 50*c* with card slot 50*cl*, side 50*d*, and upper face 50*e*.

Figure 20:
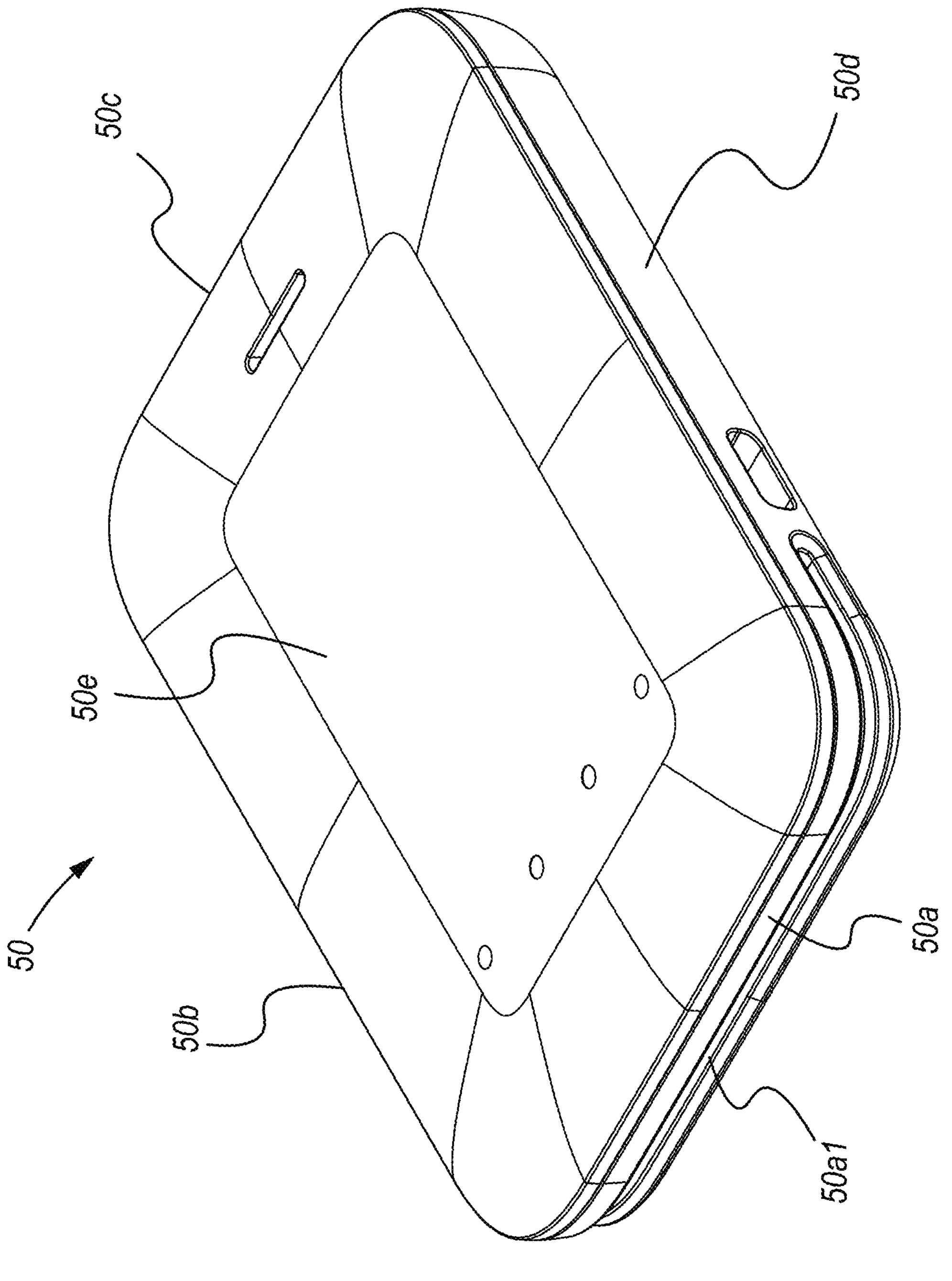
FIG. 20 is a second top perspective view of the card reader assembly of FIG. 19.

Turning to FIG. 20, depicted therein is a second top perspective view of card reader assembly 50.

Figure 21:
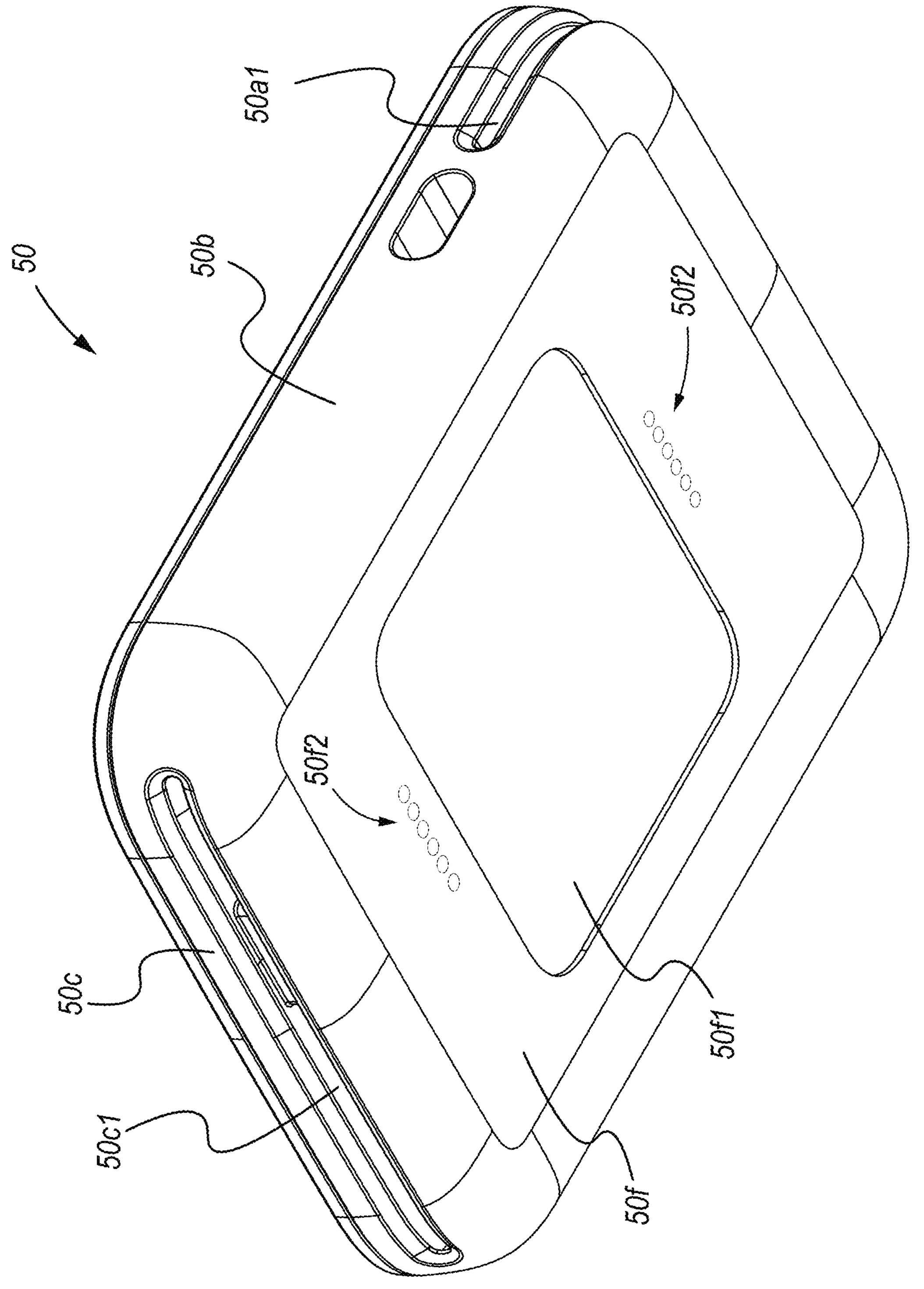
FIG. 21 is a first bottom perspective view of the card reader assembly of FIG. 19.

Turning to FIG. 21, depicted therein is a first bottom perspective view of card reader assembly 50. Depicted implementation of card reader assembly 50 is shown to include lower face 50*f* with coupling surface 50*f*1, and electrical interface 50*f*2.

Figure 22:
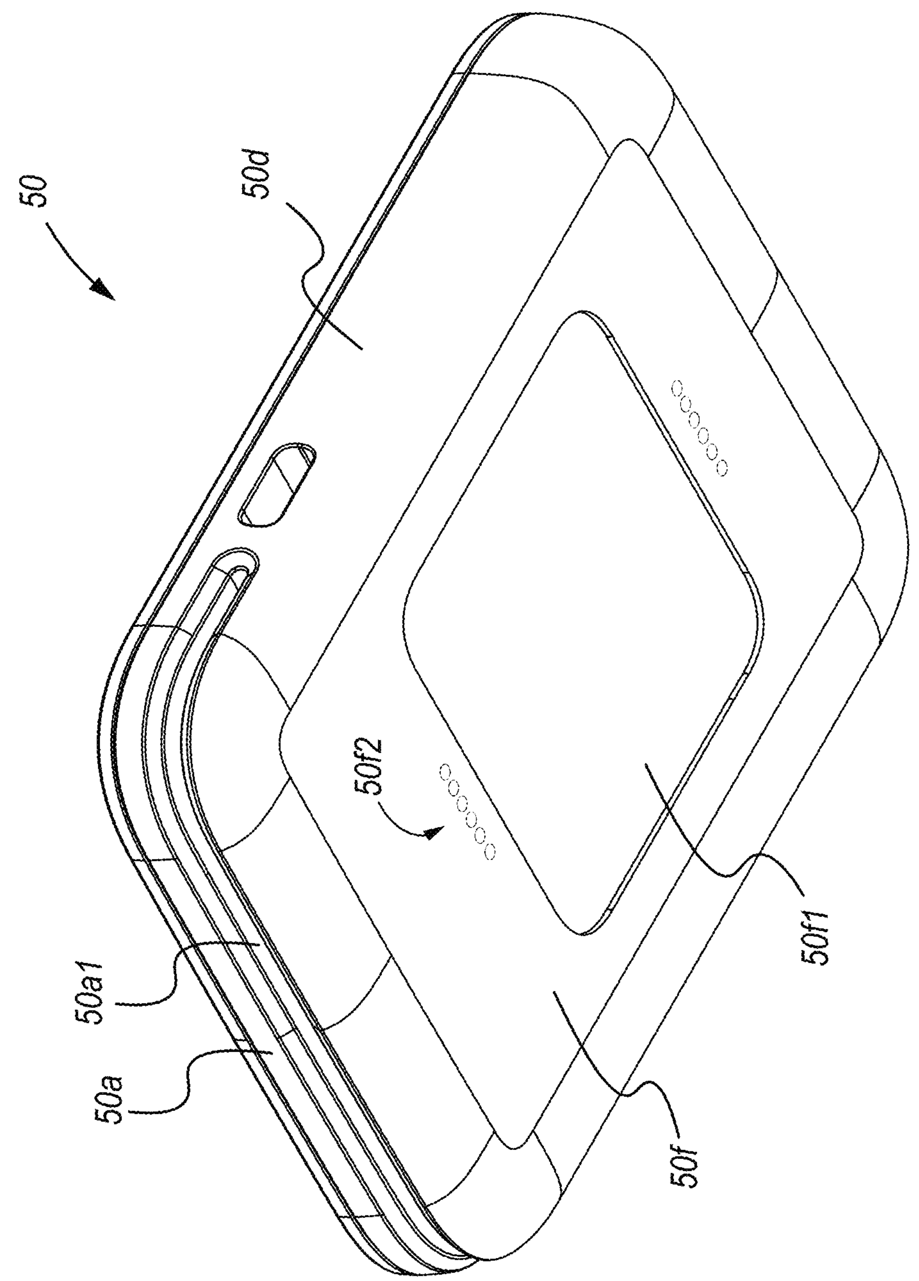
FIG. 22 is a second bottom perspective view of the card reader assembly of FIG. 19.

Turning to FIG. 22, depicted therein is a second bottom perspective view of card reader assembly 50.

Figure 23:
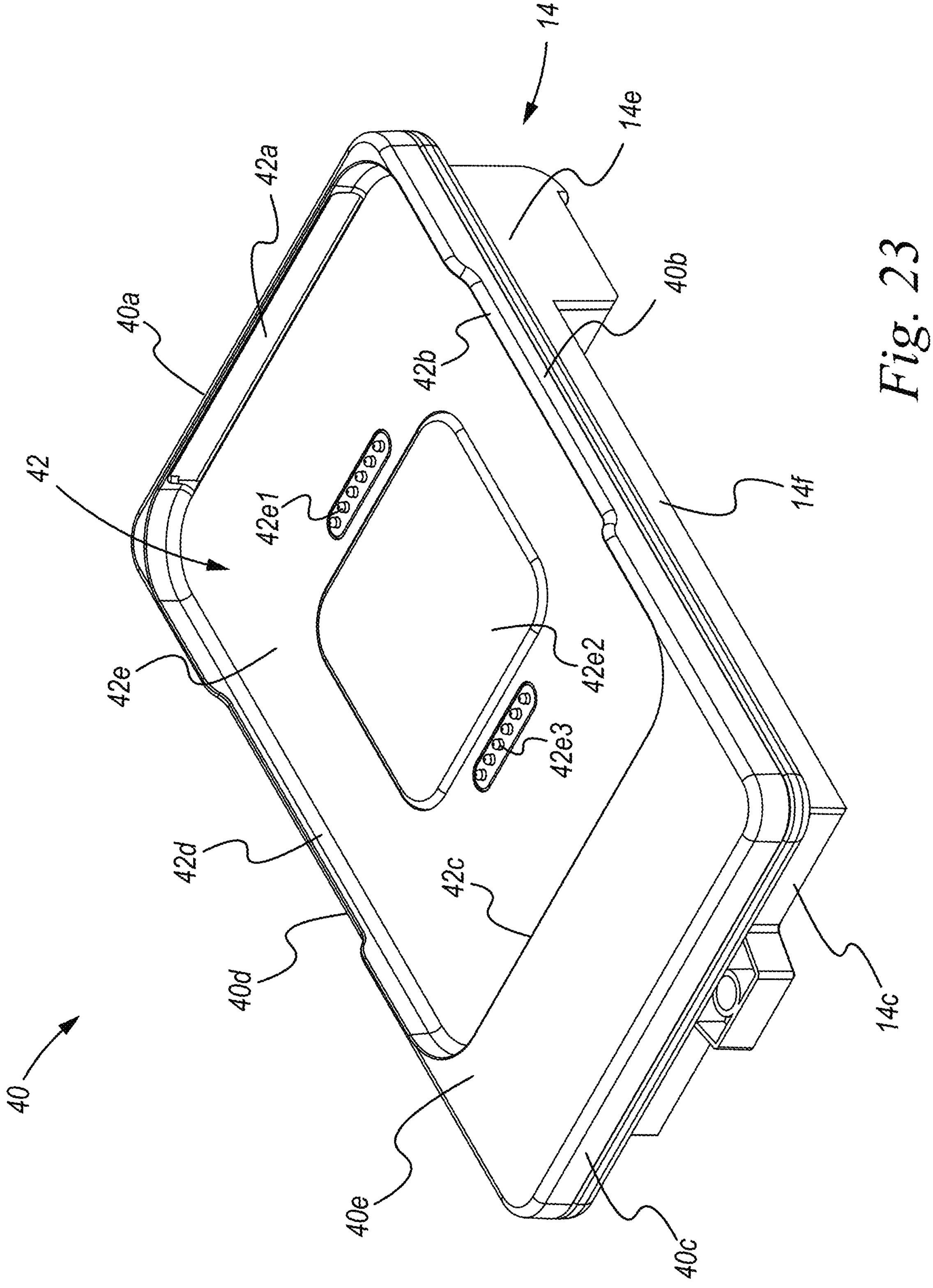
FIG. 23 is a top perspective view of the adapter assembly of FIG. 17 coupled with the accessory assembly of FIG. 1.

Turning to FIG. 23, depicted therein is a top perspective view of adapter assembly 40 coupled with accessory assembly 10.

Figure 24:
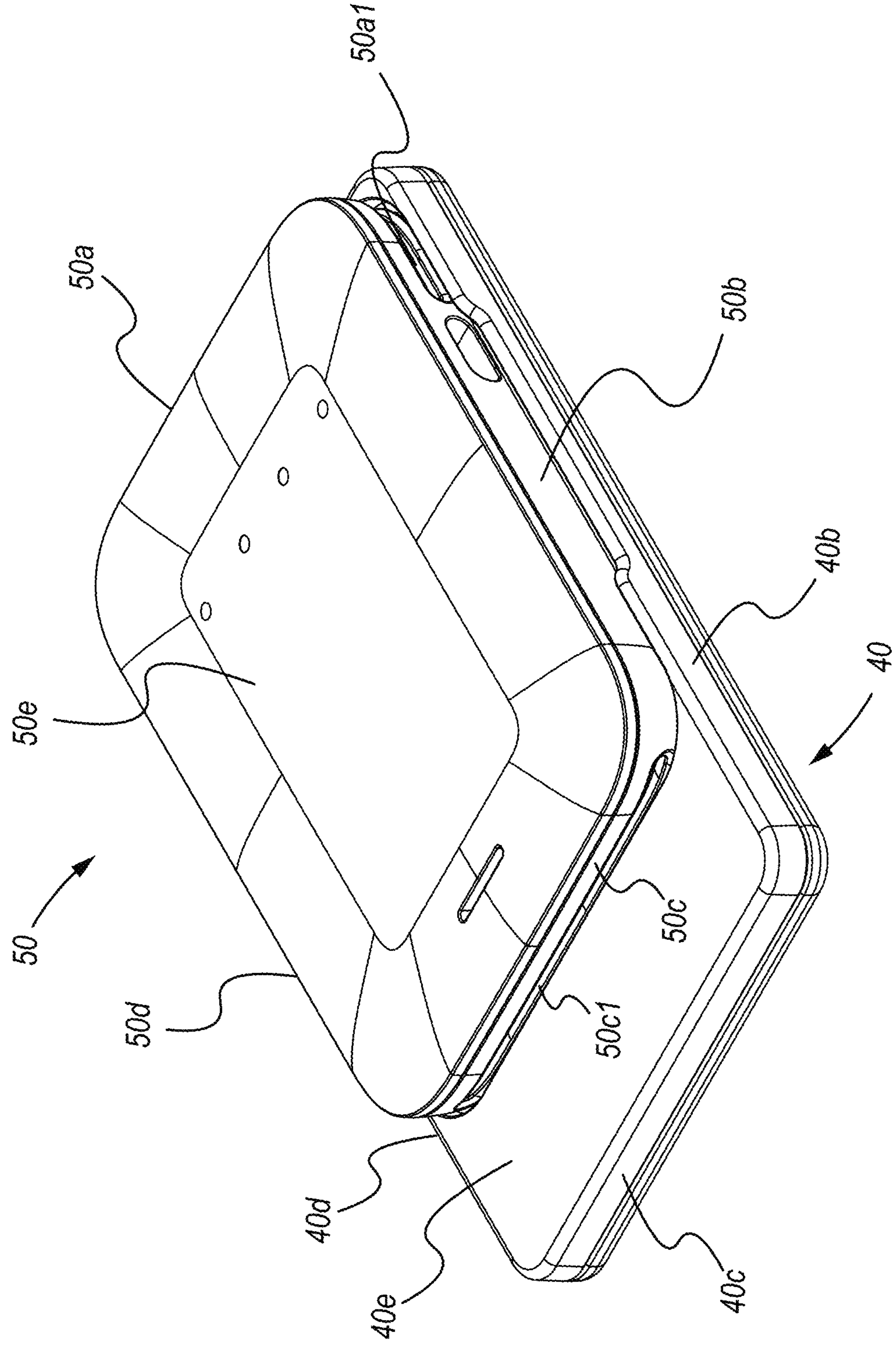
FIG. 24 is a first top perspective view of the card reader assembly of FIG. 19 coupled with the adapter assembly of FIG. 17.

Turning to FIG. 24, depicted therein is a first top perspective view of card reader assembly 50 coupled with adapter assembly 40.

Figure 25:
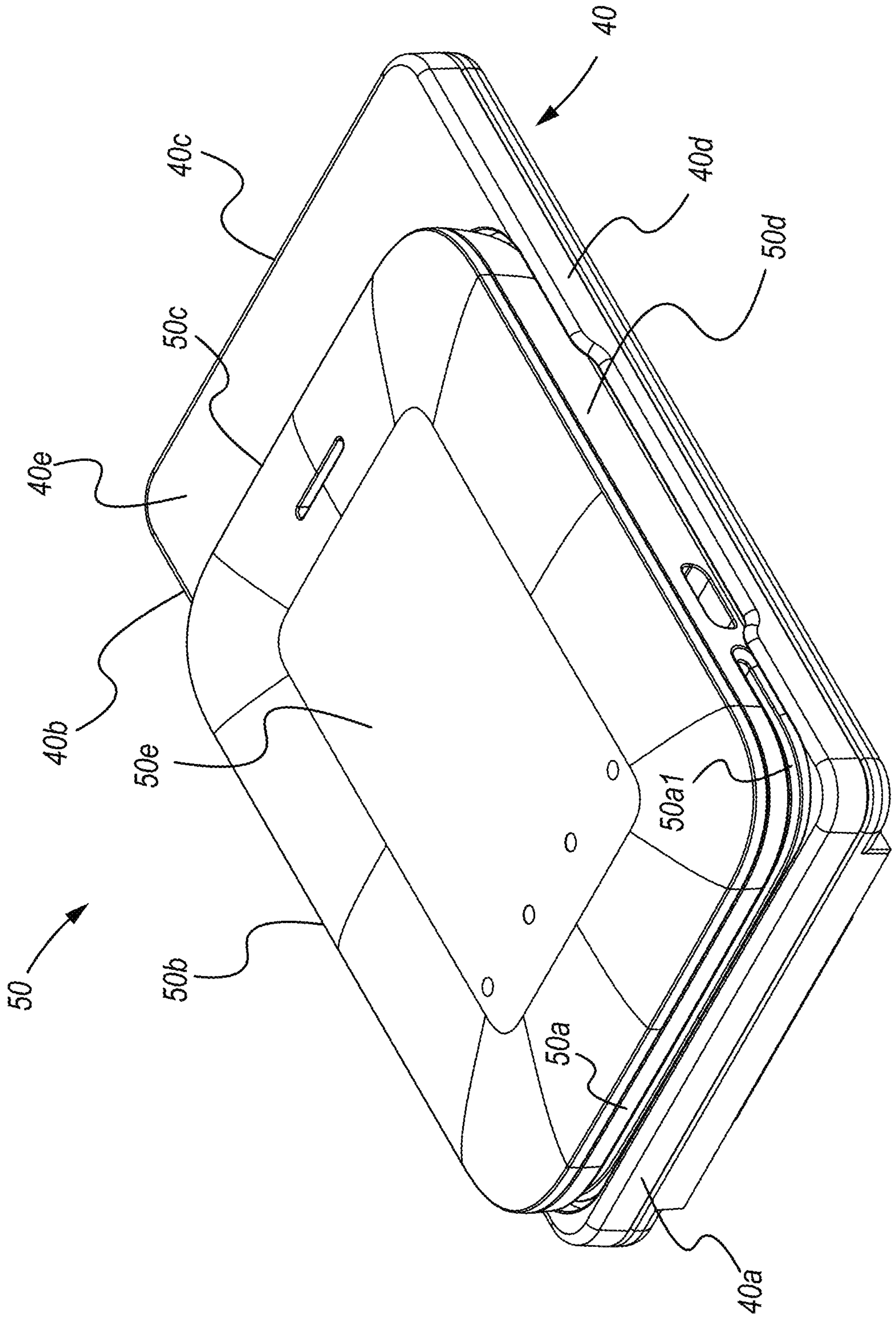
FIG. 25 is a second top perspective view of the card reader assembly of FIG. 19 coupled with the adapter assembly of FIG. 17.

Turning to FIG. 25, depicted therein is a second top perspective view of card reader assembly 50 coupled with adapter assembly 40.

Figure 26:
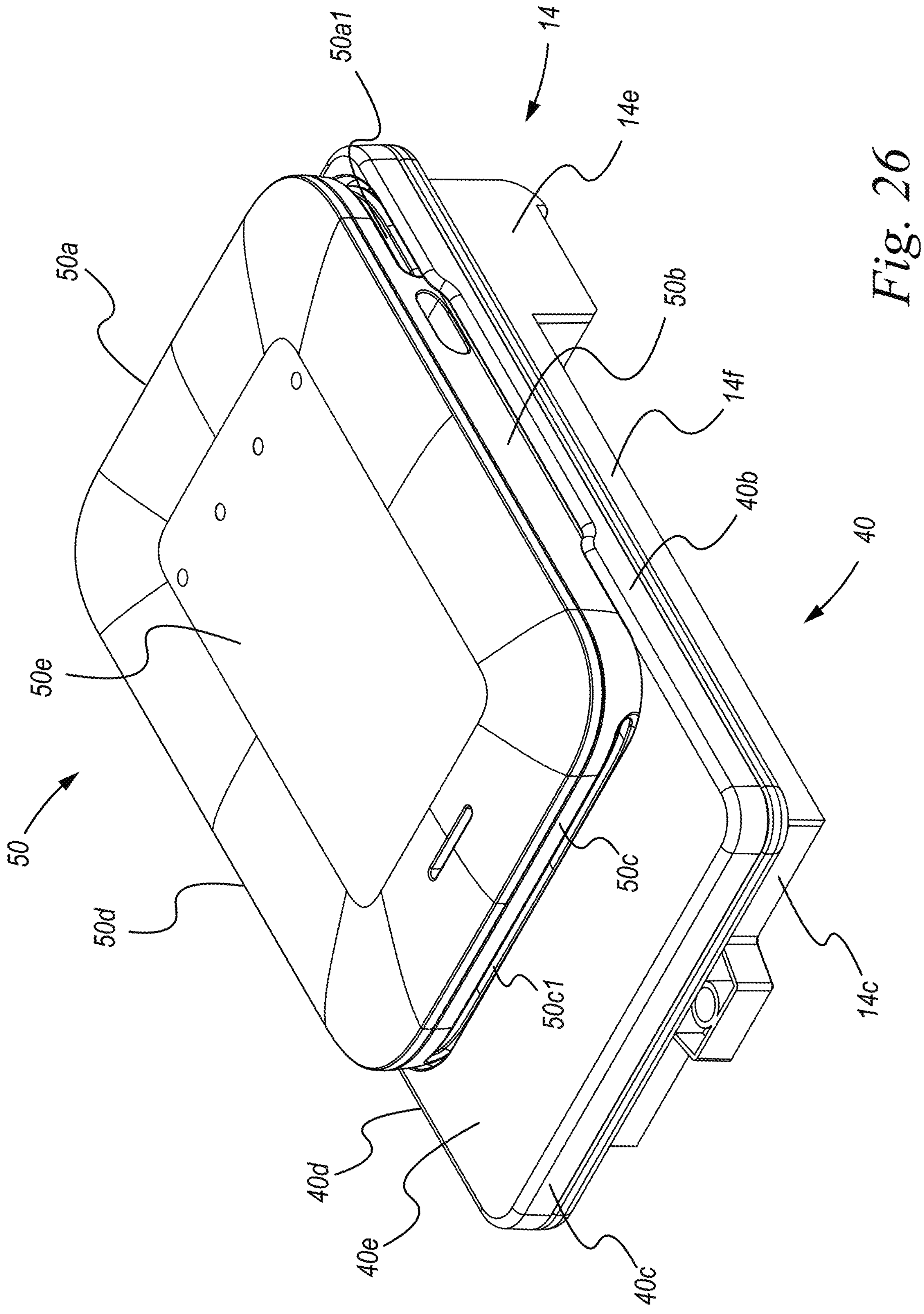
FIG. 26 is a top perspective view of the card reader assembly of FIG. 19 coupled with the adapter assembly of FIG. 17 coupled with the accessory assembly of FIG. 1.

Turning to FIG. 26, depicted therein is a top perspective view of card reader assembly 50 coupled with adapter assembly 40 coupled with accessory assembly 10.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A system for a portable electronic device and a portable electronic device case, the system comprising:
(I) an accessory assembly including
(A) a first side portion including and an exterior surface portion with at least one elongated channel portion depressed therefrom, and
(B) a second side portion extending perpendicular with the first side portion;
wherein the accessory assembly is removably couplable to the portable electronic device case and is removably couplable to the portable electronic device,
wherein the accessory assembly includes at least one electronic function for the portable electronic device,
wherein the first side portion of the accessory assembly remains unobstructed when the accessory assembly is coupled with the portable electronic device case, and
wherein the first side portion of the accessory assembly remains unobstructed when the accessory assembly is coupled with the portable electronic device.

2. The system of claim 1
wherein the at least one elongated channel portion lacks an end wall to provide at least one entry portion.

3. The system of claim 2
wherein the second side portion faces in a direction similar to that faced by the at least one entry portion.

4. The system of claim 1
wherein the at least one elongated channel extends perpendicularly with the second side portion.

5. The system of claim 1
wherein the accessory assembly further includes a cover component,
wherein the cover component includes a planar surface portion,
wherein the cover component includes at least one elongated rail portion extending from the planar surface portion,
wherein the at least one elongated rail portion is sized to couple with the at least one elongated channel portion, and
wherein the planar surface portion of the cover component is adjacent the exterior surface portion of the first side when the at least one elongated rail portion is coupled with the at least one elongated channel portion.

6. The system of claim 1 further including an adapter assembly,
wherein the adapter assembly includes a planar surface portion,
wherein the adapter assembly includes at least one elongated rail portion extending from the planar surface portion,
wherein the at least one elongated rail portion is sized to couple with the at least one elongated channel portion, and
wherein the planar surface portion of the adapter assembly is adjacent the exterior surface portion of the first side when the at least one elongated rail portion is coupled with the at least one elongated channel portion.

7. The system of claim 6
wherein the adapter assembly is removably couplable with at least one electronic payment card reader.

8. The system of claim 7
wherein the adapter assembly is removably couplable with the at least one electronic payment card reader in more that one orientation of the at least one electronic payment card reader.

9. The system of claim 7
wherein the adapter assembly includes a depressed portion shaped to couple with the at least one electronic payment card reader.

10. A system for a portable electronic device and a portable electronic device case, the system comprising:
(I) an accessory assembly including
(A) a first side portion including and an exterior surface portion with at least one elongated channel portion depressed therefrom, and
(B) a second side portion extending perpendicular with the first side portion; and
(II) an adapter assembly including
(A) at least one planar surface portion,
(B) at least one elongated one elongated rail portion extending from the at least one planar surface portion,
wherein the accessory assembly is removably couplable to the portable electronic device case and is removably couplable to the portable electronic device,
wherein the accessory assembly includes at least one electronic function for the portable electronic device,
wherein the first side portion of the accessory assembly remains unobstructed when the accessory assembly is coupled with the portable electronic device case,
wherein the first side portion of the accessory assembly remains unobstructed when the accessory assembly is coupled with the portable electronic device, and
wherein the at least one elongated rail portion is sized to removably couplable with the at least one elongated channel portion to removably couple the adapter assembly with the accessory assembly.

11. The system of claim 10
wherein the planar surface portion of the adapter assembly is adjacent the exterior surface portion of the first side of the accessory assembly when the at least one elongated rail portion is coupled with the at least one elongated channel portion.

12. The system of claim 10
wherein the adapter assembly is removably couplable with at least one electronic payment card reader.

13. The system of claim 12
wherein the adapter assembly is removably couplable with the at least one electronic payment card reader in more that one orientation of the at least one electronic payment card reader.

14. The system of claim 13
wherein the adapter assembly includes a depressed portion shaped to removably couple with the at least one electronic payment card reader.

15. A system for a portable electronic device, the system comprising:
(I) an accessory assembly including
(A) a first side portion including and an exterior surface portion with at least one elongated channel portion depressed therefrom, and
(B) a second side portion extending perpendicular with the first side portion; and
(II) a portable electronic device case assembly including
(A) a docking bay;

wherein the accessory assembly includes at least one electronic function for the portable electronic device, wherein the accessory assembly is removably couplable with the docking bay of the portable electronic device case, and wherein the first side portion of the accessory assembly remains unobstructed when the accessory assembly is coupled with the portable electronic device case.

16. The system of claim 15 wherein the at least one elongated channel lacks an end wall to provide at least one entry portion.

17. The system of claim 15 wherein the accessory assembly further includes a cover component, wherein the cover component includes a planar surface portion, wherein the cover component includes at least one elongated rail portion extending from the planar surface portion, wherein the at least one elongated rail portion is sized to removably couple with the at least one elongated channel portion, and wherein the planar surface portion of the cover component is adjacent the exterior surface portion of the first side portion when the at least one elongated rail portion is coupled with the at least one elongated channel portion.

18. The system of claim 15 further including an adapter assembly, wherein the adapter assembly includes a planar surface portion, wherein the adapter assembly includes at least one elongated rail portion extending from the planar surface portion, wherein the at least one elongated rail portion is sized to couple with the at least one elongated channel portion, and wherein the planar surface portion of the adapter assembly is adjacent the exterior surface portion of the first side portion when the at least one elongated rail portion is coupled with the at least one elongated channel portion.

19. The system of claim 18 wherein the adapter assembly is removably couplable with at least one electronic payment card reader.

20. The system of claim 19 wherein the adapter assembly includes a depressed portion shaped to removably couple with the at least one electronic payment card reader.

* * * * *